US006423956B1

(12) United States Patent
Mandella et al.

(10) Patent No.: US 6,423,956 B1
(45) Date of Patent: *Jul. 23, 2002

(54) FIBER-COUPLED, HIGH-SPEED, INTEGRATED, ANGLED-DUAL-AXIS CONFOCAL SCANNING MICROSCOPES EMPLOYING VERTICAL CROSS-SECTION SCANNING

(75) Inventors: Michael J. Mandella, Cupertino; Mark H. Garrett, Morgan Hill; Gordon S. Kino, Stanford, all of CA (US)

(73) Assignee: Optical Biopsy Technologies, San Jose, CA (US)

( * ) Notice: Subject to any disclaimer, the term of this patent is extended or adjusted under 35 U.S.C. 154(b) by 76 days.

This patent is subject to a terminal disclaimer.

(21) Appl. No.: 09/628,118

(22) Filed: Jul. 28, 2000

(51) Int. Cl.[7] .............................................. G02B 26/08
(52) U.S. Cl. ..................... 250/201.3; 250/235; 359/215; 359/385
(58) Field of Search ........................... 250/201.3, 201.5, 250/234, 235; 359/203, 205, 206, 210, 212, 214, 215, 223, 368, 372, 373, 385, 389; 369/44.14, 44.17, 44.23

(56) References Cited

U.S. PATENT DOCUMENTS

| 5,120,953 | A | | 6/1992 | Harris ........................ 250/227 |
| 5,161,053 | A | | 11/1992 | Dabbs ........................ 359/384 |
| 5,321,501 | A | | 6/1994 | Swanson et al. ............. 356/345 |
| 5,969,854 | A | | 10/1999 | Stelzer et al. ............... 359/385 |
| 5,973,828 | A | | 10/1999 | Webb ......................... 359/385 |
| 6,028,306 | A | | 2/2000 | Hayashi ...................... 250/235 |
| 6,057,952 | A | | 5/2000 | Kubo et al. ................. 359/196 |
| 6,064,518 | A | | 5/2000 | Stelzer et al. ............... 359/368 |
| 6,069,698 | A | | 5/2000 | Ozawa et al. ............... 356/345 |
| 6,088,145 | A | | 7/2000 | Dickensheets et al. ...... 359/196 |
| 6,118,580 | A | * | 9/2000 | Webb .......................... 359/385 |
| 6,134,003 | A | | 10/2000 | Tearney et al. ............. 356/345 |
| 6,263,234 | B1 | * | 7/2001 | Engelhardt et al. ......... 600/476 |
| 6,351,325 | B1 | * | 2/2002 | Mandella et al. ........... 359/210 |

FOREIGN PATENT DOCUMENTS

DE 4326473 2/1995

OTHER PUBLICATIONS

Stelzer et al., "A new tool for the observation of embryos and other large specimens: confocal theta fluorescence microscopy", Journal of Microscopy, vol. 179, Pt. 1, Jul. 1995, pp. 1–10.

(List continued on next page.)

Primary Examiner—Robert H. Kim
Assistant Examiner—Chih-Cheng Glen Kao
(74) Attorney, Agent, or Firm—Lumen Intellectual Property Services

(57) ABSTRACT

This invention provides an angled-dual-axis confocal scanning microscope comprising a fiber-coupled, angled-dual-axis confocal scanning head and a vertical scanning unit. The angled-dual-axis confocal scanning head is configured such that an illumination beam and an observation beam intersect optimally at an angle $\theta$ within an object and the scanning is achieved by pivoting the illumination and observation beams using a single scanning element, thereby producing an arc-line scan. The vertical scanning unit causes the angled-dual-axis confocal scanning head to move towards or away from the object. By integrating the angled-dual-axis confocal scanning microscope of the present invention with fiber-optic components and a fiber-coupled laser, the present invention also provides an assembly of fiber-based angled-dual-axis confocal scanning systems that can be particularly powerful tools in biological and medical imaging applications, such as instruments for performing optical coherence microscopy and in vivo optical biopsies.

98 Claims, 17 Drawing Sheets

OTHER PUBLICATIONS

Rollins et al., "SNR analysis of conventional and optimal fiber–optic low–coherence interferometer topologies", In Coherence Domain Optical Methods in Biomedical Science and Clinical Applications IV, Proceedings of SPIE, vol. 3915, 2000, pp. 60–67.

Rollins et al., "Optimal interferometer designs for optical coherence tomography", Optics Letters, vol. 24, No. 21, Nov. 1, 1999, pp. 1484–1486.

Podoleanu, "Unbalanced versus balanced operation in an optical coherence tomography system", Applied Optics, vol. 39, No. 1, Jan. 1, 2000, pp. 173–182.

Lindek et al., "Optical transfer functions for Confocal theta fluorescence microscopy", J. Opt. Soc. Am. A, vol. 13, No. 3, Mar. 1996, pp. 479–482.

Stelzer et al., "Fundamental reduction of the observation volume in far–field light microscopy by detection orthogonal to the illumination axis: confocal theta microscopy", Optics Communications 111 91994), pp. 536–547.

Hell et al., "Far–field fluorescence microscopy with three–dimensional resolution in the 100–nm range", Journal of Microscopy, vol. 187, Pt. 1, Jul. 1997, pp. 1–7.

Webb et al., "Confocal microscope with large field and working distance", Applied Optics, vol. 38, No. 22, Aug. 1, 1999, pp. 4870–4875.

Sinzinger et al., "Planar optical Confocal microscope for imaging and sensing" European Optical Society Topical Meetings Digest Series, vol. 9, Engelberg, Switzerland, Apr. 19996, pp. 1–3.

Klug et al., "Implementation of multilens micro–optical systems with large numerical aperture by stacking of microlenses", Applied Opitcs, vol. 38, No. 34, Dec. 1, 1999.

Drexler et al., "In vivo ultrahigh–resolution optical coherence tomography", Optics Letters, 21(17), 1999 pp. 1221–1223.

Wang et al., "High Speed, full field optical coherence microscopy", Proceedings of the SPIE Conference on Coherence Domain Optical Methods in Biomedical Science and Clinical Applications III, San Jose, California, Jan. 1999, pp. 204–212.

* cited by examiner

FIBER-COUPLED, HIGH-SPEED, INTEGRATED, ANGLED-DUAL-AXIS CONFOCAL SCANNING MICROSCOPES EMPLOYING VERTICAL CROSS-SECTION SCANNING

CROSS-REFERENCE TO RELATED APPLICATIONS

This application is related to the following copending U.S. patent applications, all of which are herein incorporated by reference: "Fiber-coupled, High-speed, Angled-Dual-Axis Optical Coherence Scanning Microscopes" of Michael J. Mandella, Mark H. Garrett, and Gordon S. Kino, Ser. No. 09/628,119; and "Fiber-coupled, Angled-Dual-Axis Confocal Scanning Microscopes for Imaging in a Scattering Medium" of Michael J. Mandella, Mark H. Garrett, and Gordon S. Kino, Ser. No. 09/627,363.

FIELD OF THE INVENTION

This invention relates generally to the field of confocal microscopes, and in particular, to a new class of fiber-coupled, angled-dual-axis confocal scanning microscopes with integrated structure, enhanced resolution, low noise, and vertical cross-section scanning.

BACKGROUND ART

The advent of fiber optics and laser technology has brought a renewed life to many areas of conventional optics. Confocal microscopes, for example, have enjoyed higher resolution, more integrated structure, and enhanced imaging capability. Consequently, confocal microscopes have become increasingly powerful tools in a variety of applications, including biological and medical imaging, optical data storage and industrial applications.

The original idea of confocal microscopy traces back to the work of Marvin Minsky. Described in his seminal U.S. Pat. No. 3,013,467 is a system in which an illumination beam passes through a pinhole, traverses a beamsplitter, and is focused by an objective to a focal volume within an object. An observation beam that emanates from the focal volume is in turn converged by the same objective lens, reflected by its second encounter with the beamsplitter, and passes through a second pinhole to an optical detector. The geometry of this confocal arrangement is such that only the light beam originating from the focal volume is able to pass through the second pinhole and reach the optical detector, thus effectively discriminating all other out-of-focus signals.

Contemporary confocal microscopes tend to adopt one of two basic confocal geometries. In the transmission arrangement using two objectives, one objective focuses an illumination beam from a point source onto a focal volume within an object and another objective collects an observation beam that emanates from the focal volume. Whereas in the so-called "reciprocal" reflection arrangement, a single objective plays a dual role of focusing light on the object and collecting the light emanated from the object. In either case, the confocal arrangement enables the confocal microscope to attain a higher resolution and sharper definition than a conventional microscope, because out-of-focus signals are rejected. This unique ability has made confocal microscopes particularly useful tools in the examination of biological specimens, since they can view a specific layer within a sample and avoid seeing other layers, the so-called "optical sectioning".

In order to image a thin layer about a few micrometers thick within a sample, however, the numerical aperture (NA) of the objective lenses must be large, so as to provide adequate resolution particularly in the axial direction. This generally results in a short working distance, which is undesirable in practice. Moreover, when imaging within tissue or scattering media, the signal is typically dominated by scattering from points far away from the focus of the large NA objective, thus resulting in noisy (low contrast) images.

A great deal of ingenuity has accordingly been devoted to improving the axial resolution of confocal microscopes without using high NA lenses. A particularly interesting approach is to spatially arrange two separate illumination and observation objective lenses, or illumination and observation beam paths, in such a way that the illumination beam and the observation beam intersect at an angle theta ($\theta$) at the focal points, so that the overall point-spread function for the microscope, i.e., the overlapping volume of the illumination and observation point-spread functions results in a substantial reduction in the axial direction. A confocal microscope with such an angled, dual-axis design is termed a confocal theta microscope, or an angled-dual-axis confocal microscope, hereinafter. Its underlying theory is stated below for the purpose of elucidating the principle of this invention. A more detailed theory of confocal theta microscopy can be found in U.S. Pat. No. 5,973,828; by Webb et al. in "Confocal microscope with large field and working distance", Applied Optics, Vol.38, No.22, pp.4870; and by Stelzer et al. in "A new tool for the observation of embryos and other large specimens: confocal theta fluorescence microscopy", Journal of Microscopy, Vol.179, Part 1, pp. 1; all incorporated by reference.

The region of the point-spread function of a microscope's objective that is of most interest is the region in which the point-spread function reaches its maximum value. This region is referred to as the "main lobe" of the point-spread function in the art. It is typically characterized in three dimensions by an ellipsoid, which extends considerably further in the axial direction than in the transverse direction. This characteristic shape is the reason that the axial resolution is inherently poorer than the transverse resolution in a conventional confocal microscope. When the main lobes of the illumination and observation point-spread functions are arranged to intersect at an angle in a confocal theta microscope, however, a predominantly transverse and therefore narrow section from one main lobe is made to multiply (i.e., zero out) a predominantly axial and therefore long section from the other main lobe. This optimal multiplication of the two point-spread functions reduces the length of the axial section of the overall point-spread function, thereby enhancing the overall axial resolution. The shape of the overall point-spread function can be further adjusted by varying the angle at which the main lobes of the illumination and observation point-spread functions intersect.

The past few years have seen a few confocal theta microscopes with similar designs in the art. For example, Stelzer et al. describe the theory of confocal theta microscopy with two and three objective high NA lenses and an angle of $\theta=90°$ in "Fundamental reduction of the observation volume in far-field light microscopy by detection orthogonal to the illumination axis: confocal theta microscopy", Optics Communications 111, pp.536. German Patent DE-OS 43 26 473 A1 demonstrates a confocal theta microscope in which the axes of two high NA objective lenses are oriented at a right angle ($\theta=90°$). It also discloses a confocal theta microscope with three high NA objective lenses, in which the axes of two objectives are perpendicular to each other, while the axis of the third objective lies on the axis of one of the other two objectives. The patent does not disclose how scanning is carried out in these confocal theta microscopes. Although scanning might be performed by translating the object to be examined in such systems, the designs of these confocal theta microscopes are such that they do not appear to readily accommodate scanning that probes into the interior of the object. U.S. Pat. No. 5,969,854 discloses a confocal theta microscope with the axes of two high NA objective lenses positioned at an angle approximately 90°. This system incorporates a scanning mechanism that translates the object for imaging purposes.

Webb et al. describe a confocal scanning microscope with angled objective lenses that have relatively low NA in "Confocal microscope with large field and working distance", Applied Optics, Vol.38, No.22, pp.4870. The design of this microscope attains usable resolutions for biological applications in both transverse and axial directions, while achieving a large field of view and a long working distance. The scanning in this case is achieved by moving a stage on which the object is mounted. U.S. Pat. No. 5,973,828 discloses a confocal theta scanning microscope in which the axes of two objective lenses intersect at a variable angle θ. Two-dimensional scanning is achieved by steering the illumination and observation beams in the back focal plane of the objective lenses to provide scanning in one direction, and by separately moving and coordinating the illumination and observation lenses to bring about overlap of the focal volumes during scanning in the other direction. It is disclosed that without such coordination the overlap cannot be maintained throughout the scanning. U.S. Pat. No. 6,064,518 describes a confocal theta microscope that uses one objective lens for focusing the illumination beam onto an object and the same objective for collecting the observation beam reflected from the object. This system employs a beam deflection unit for directing the illumination beam from the objective lens onto an object and for passing the observation beam reflected from the object to the same objective lens. The patent points out that the scanning may be obtained by either moving the beam deflection unit such that the illumination and observation beams scan the object, or by moving the object itself via a translation stage. However, no specific scanning mechanism is disclosed. The design of this system is such that it does not lend itself to miniaturization and fast scanning as required for in vivo imaging applications. Moreover, it provides inadequate working distance for in vivo imaging of live specimens since the object must be placed between the objective and the deflection unit.

One drawback to translating the object to be scanned is that in many applications it is difficult, if not entirely impossible, to maneuver the object such that high speed and precision scanning is attained. This problem can be particularly acute in imaging objects in scattering media, such as in vivo imaging of live tissue in biological and medical applications. Moving the two objective lenses through separate mechanisms as described in U.S. Pat. No. 5,973,828, on the other hand, requires that the translations of the illumination and observation lenses be coordinated and synchronized such that the main lobes of the illumination and observation point-spread functions intersect optimally at all target points on the path to be scanned. Such coordination can be quite cumbersome to implement, rendering fast and high precision scanning difficult to achieve. Although the possibility of scanning the illumination and observation beams is proposed in U.S. Pat. No. 6,064,518, the particular design of the confocal theta microscope disclosed in this patent does not lend itself to fast and maneuverable scanning using this scheme.

Furthermore, as described in the above prior art, confocal theta microscopes use various mechanical pinholes to provide a point light source and a point detector. The disadvantage with using mechanical pinholes is the lack of flexibility and ruggedness. The optical systems incorporating mechanical pinholes are also difficult to align and miniaturize. In addition, slight misalignment of a mechanical pinhole or any other optical element can result in asymmetric intensity distribution of the light emerging from the pinhole, causing aberrations.

In recent years optical fibers have been used in confocal systems to transmit light more flexibly. A single-mode fiber is typically used so that an end of the fiber is also conveniently utilized as a pinhole for both light emission and detection. This arrangement is not susceptible to the alignment problems the mechanical pinholes in the prior art systems tend to suffer. Moreover, the use of optical fibers enables the microscopes to be more flexible and compact in structure, along with greater maneuverability in scanning. U.S. Pat. Nos. 5,120,953, 5,161,053, 5,742,419 and 5,907,425, for instance, disclose conventional reciprocal confocal scanning microscopes using a single optical fiber to transmit light. The end of the fiber provides a point illumination source and a point detector. The scanning in these systems is achieved by maneuvering the fiber end. Confocal theta microscopy is not employed in these systems, however.

Hence, what is needed in the art is a confocal scanning microscope that attains enhanced axial resolution, a long working distance and a large field of view, fast and high precision scanning, without involving complicated coordination of scanning actions. The desired confocal scanning microscope should also achieve high sensitivity and large dynamic range when imaging in a scattering medium, so as to produce high image contrast. Additionally, the desired confocal scanning microscope should have an integrated and scalable structure, rendering it a modular and versatile device.

OBJECTS AND ADVANTAGES

Accordingly it is a principal object of the present invention to provide an angled-dual-axis confocal scanning microscope for imaging in tissue or a scattering medium that:

a) uses low NA and therefore inexpensive objective lenses;
b) attains improved axial resolution;
c) provides a larger field of view;
d) affords a longer working distance;
e) achieves higher sensitivity and larger dynamic range of detection;
f) is fiber-coupled;
g) has higher power efficiency;
h) performs vertical cross-section scanning; and
i) has small, compact, integrated, and simple construction.

It is a further object of the present invention to provide an assembly of fiber-based angled-dual-axis confocal scanning systems that advantageously combine the angled-dual-axis confocal scanning microscope of the present invention and fiber-optic components.

These and other objects and advantages will become apparent from the following description and accompanying drawings.

SUMMARY OF THE INVENTION

This invention provides an angled-dual-axis confocal scanning microscope, comprising an angled-dual-axis confocal scanning head and a vertical scanning unit. The angled-dual-axis confocal scanning head further comprises a first end of a first single-mode optical fiber serving as a point light source, an angled-dual-axis focusing means, a scanning means, and a first end of a second single-mode optical fiber serving as a point light detector.

From the first end of the first optical fiber an illumination beam emerges. The angled-dual-axis focusing means serves to focus the illumination beam to a diffraction-limited illumination focal volume along an illumination axis within an object. The angled-dual-axis focusing means further receives an observation beam emanated from an observation focal volume along an observation axis within the object, and focuses the observation beam to the first end of the second optical fiber. The angled-dual-axis focusing means is so designed that the illumination axis and the observation axis intersect at an angle θ within the object, such that the illumination and observation focal volumes intersect optimally at a confocal overlapping volume. The scanning means, in the form of a single scanning element disposed between the angled-dual-axis focusing means and the object, is positioned such that it receives the illumination beam from the angled-dual-axis focusing means and directs the illumination beam to the object; and that it collects the observation beam emanated from the object and passes the observation beam to the angled-dual-axis focusing means. The scanning means is further capable of pivoting the illumination and observation beams jointly in such a way that the illumination and observation axes remain intersecting optimally at a fixed angle θ and that the confocal overlapping volume moves along an arc-line within the object, thereby producing an arc-line scan. The vertical scanning unit comprises a vertical translation means and a compensation means. The vertical translation means is mechanically coupled to the angled-dual-axis confocal scanning head, such that it causes the angled-dual-axis confocal scanning head to move towards or away from the object, whereby a succession of arc-line scans that progressively deepen into the object is produced, providing a two-dimensional vertical cross-section scan of the object. The compensation means keeps the optical path lengths of the illumination and observation beams substantially unchanged, thereby ensuring the optimal intersection of the illumination and observation focal volumes in the course of vertical scanning. Altogether, the angled-dual-axis confocal scanning microscope of the present invention is designed such that it is capable of performing vertical cross-section scanning in a line-by-line fashion with enhanced axial (i.e., vertical) resolution and greater speed, while maintaining a workable working distance and a large field of view. Additionally, the object may be moved incrementally in a direction perpendicular to the vertical cross-section scan plane as each vertical cross-section scan is completed, resulting in a plurality of vertical cross-section images that can be assembled into a three-dimensional image of a region within the object.

It is to be understood that the term "emanating" as used in this specification is to be construed in a broad sense as covering any light transmitted back from the object, including reflected light, scattered light, and fluorescent light. It should be also understood that when describing the intersection of the illumination and observation beams in this specification, the term "optimal" means that the illumination and observation focal volumes (i.e., the main lobes of the illumination beam's point-spread function and the observation beam's point-spread function) intersect in such a way that their respective centers substantially coincide and the resulting overlapping volume has comparable transverse and axial extents. This optimal overlapping volume is termed "confocal overlapping volume" in this specification.

In an angled-dual-axis confocal scanning head of the present invention, the angled-dual-axis focusing means generally comprises an assembly of beam focusing, collimating, and deflecting elements. Such elements can be selected from the group of refractive lenses, diffractive lenses, GRIN lenses, focusing gratings, micro-lenses, holographic optical elements, binary lenses, curved mirrors, flat mirrors, prisms and the like. A crucial feature of the angled-dual-axis focusing means is that it provides an illumination axis and an observation axis that intersect optimally at an angle θ. The scanning means typically comprises an element selected from the group consisting of mirrors, reflectors, acousto-optic deflectors, electro-optic deflectors, mechanical scanning mechanisms, and Micro-Electro-Mechanical-Systems (MEMS) scanning micro-mirrors. A key feature is that the scanning means is in the form of a single element, as opposed to two or more separate scanning elements in many prior art confocal scanning systems. A preferred choice for the scanning means is a flat pivoting mirror, particularly a silicon micro-machined scanning mirror for its compact and light-weight construction. Moreover, the optical fibers can be single-mode fibers, multi-mode fibers, birefrigent fibers, polarization maintaining fibers and the like. Single-mode fibers are preferable in the present invention, for the ends of single-mode fibers provide a nearly point-like light source and detector.

A unique feature of the angled-dual-axis confocal scanning head of the present invention is that the scanning means is placed between the angled-dual-axis focusing means and the object to be examined. This enables the best on-axis illumination and observation point-spread functions to be utilized throughout the entire angular range of an arc-line scan, thereby providing greater resolution over a larger transverse field of view, while maintaining diffraction-limited performance. Such an arrangement is made possible by taking advantage of the longer working distance rendered by using relatively lower NA focusing elements or lenses in the angled-dual-axis focusing means.

Another important advantage of the angled-dual-axis arrangement of the present invention is that since the observation beam is positioned at an angle relative to the illumination beam, scattered light along the illumination beam does not easily get passed into the observation beam, except where the beams overlap. This substantially reduces scattered photon noise in the observation beam, thus enhancing the sensitivity and dynamic range of detection. This is in contrast to the direct coupling of scattered photon noise between the illumination and observation beams in a transmission or reciprocal confocal microscope, due to the collinear arrangement between the beams. Moreover, by using low NA focusing elements (or lenses) in an angled-dual-axis confocal scanning system of the present invention, the illumination and observation beams do not become overlapping until very close to the focus. Such an arrangement further prevents scattered light in the illumination beam from directly "jumping" to the observation beam, hence further filtering out scattered photon noise in the observation beam. Altogether, the angled-dual-axis confocal system of the present invention has much lower noise and is capable of providing much higher contrast when imaging in a scattering medium than the prior art confocal systems employing high NA lenses, rendering it highly suitable for imaging within biological specimens.

A further advantage of the present invention is that the entire angled-dual-axis confocal scanning head can be mounted on a silicon substrate etched with precision V-grooves where various optical elements are hosted. Such an integrated device offers a high degree of integrity, maneuverability, scalability, and versatility, while maintaining a workable working distance and a large field of view. In particular, a micro-optic version of an integrated, angled-dual-axis confocal scanning head of the present invention can be very useful in biological and medical imaging applications, e.g., endoscopes and hand-held optical biopsy instruments.

The present invention further provides a first angled-dual-axis confocal scanning system, comprising an angled-dual-axis confocal scanning microscope of the present invention, a light source, and an optical detector. The light source is optically coupled to the second end of the first optical fiber of the angled-dual-axis confocal scanning microscope, providing an illumination beam; and the optical detector is optically coupled to a second end of the second optical fiber of the angled-dual-axis confocal scanning microscope, receiving an observation beam collected from an object. The light source can be a continuous wave (CW) or a pulsed source such as a fiber laser, a semiconductor optical amplifier, an optical fiber amplifier, a semiconductor laser, a diode pumped solid state laser, or other suitable fiber-coupled light source known in the art. The optical detector can be a PIN diode, an avalanche photo diode (APD), or a photomultiplier tube. Such an angled-dual-axis confocal scanning system provides a simple and versatile imaging tool with high resolution and fast scanning capability.

It is known in the art that many biological tissues, such as tendons, muscle, nerve, bone, cartilage and teeth, exhibit birefrigence due to their linear or fibrous structure. Birefrigence causes the polarization state of light to be altered (e.g., rotated) in a prescribed manner upon refection. Skin is another birefrigent medium. Collagen contained in skin is a weakly birefrigent material. At temperatures between 56–65° C., collagen denatures and loses its birefrigence. Thus, by detecting induced changes in the polarization state of light reflected from a skin sample, an image representing the regions of skin where thermal injury occurs can be identified. The angled-dual-axis confocal scanning system described above can be modified to image such a birefrigent-scattering (or other polarization-altering) medium. A polarized light source is optically coupled to a second end of the first optical fiber of the angled-dual-axis confocal scanning microscope, providing a polarized illumination beam. The birefrigent (or other polarization-altering) "scatterers" emanate an observation beam whose polarization is altered (e.g., rotated) relative to the polarization of the illumination beam. Such a rotated polarization can be represented in two orthogonal polarization components. A polarizing beam-splitter is then optically coupled to a second end of the second optical fiber of the angled-dual-axis confocal scanning microscope, serving to route the two orthogonal polarization components of the observation beam to two separate optical detectors. An image representing the birefrigent (or other polarization-altering) "scatterers" can be accordingly constructed.

The present invention also provides an angled-dual-axis confocal scanning module, comprising an angled-dual-axis confocal scanning microscope of the present invention optically coupled to a non-reciprocal three-port optical circulator. The third and first ports of the optical circulator are optically coupled to the second ends of the first and second optical fibers of the angled-dual-axis confocal scanning microscope, respectively; and the second port of the optical circulator serves as a bi-directional input/output port. The configuration of the angled-dual-axis confocal scanning module is such that an illumination beam transmitted to the second port is in turn passed into the third port of the optical circulator and then coupled to the second end of the first optical fiber of the angled-dual-axis confocal scanning microscope in nearly its entirety; and an observation beam collected by the angled-dual-axis confocal scanning microscope is delivered to the first port and then routed to the second port of the optical circulator, to be further utilized or detected in nearly its entirety. As such, the angled-dual-axis confocal scanning module of the present invention provides a modular angled-dual-axis confocal scanning device with a single input/output port, and can be readily adapted in a variety of applications, as the following embodiments demonstrate.

For example, by coupling the angled-dual-axis confocal scanning module of the present invention to a first output aperture of a self-detecting laser source having two output apertures, an illumination beam is transmitted from the first output aperture of the laser to the angled-dual-axis confocal scanning module, and an observation beam collected by the module is in turn back coupled to the laser via the same output aperture. The feedback of the observation beam emanated from an object alters the light intensity as well as the modes supported by the laser cavity, and the resulting changes or perturbations can be detected by coupling an optical detector to a second output aperture of the laser. The presence of the non-reciprocal optical circulator in the angled-dual-axis confocal scanning module allows nearly 100% of the observation beam to be back coupled to the laser, hence maximizing the signal-to-noise ratio in detection. The use of a self-detecting laser as an integrated light source and detector further simplifies the structure of this angled-dual-axis confocal scanning system. Moreover, a frequency shifter (or a phase modulator) can be optically coupled to this angled-dual-axis confocal scanning system, arranged such that the frequency of the observation beam is shifted. The feedback of the frequency-shifted (or phase-modulated) observation beam to the laser results in the laser's output beam being modulated at a beat frequency, thereby allowing for more sensitive heterodyne detection. The system thus described constitutes the second angled-dual-axis confocal scanning system of the present invention.

If the self-detection laser source is equipped with only one output aperture, the angled-dual-axis confocal scanning module of the present invention can be optically coupled to the laser via a beam-splitting means, such as a 90/10 fiber-optic coupler or other low-coupling tap coupler. The beam-splitting means serves to divert a portion of the laser's output beam, which carries the perturbations due to the back coupling of the observation beam, to a detection path to which an optical detector may be coupled. Such a system constitutes the third angled-dual-axis confocal scanning system of the present invention.

The self-detecting characteristics of lasers have been advantageously exploited in the art to provide an integrated light source and detector, which also demonstrates the inherent high sensitivity of this method of optical detection. A great deal of effort has also been devoted to eliminate such sensitive feedback effects (e.g., optical isolators with non-reciprocal optical elements such as Faraday rotators are designed to eliminate or block the back-coupling of light). In the present invention, the self-detecting laser can be a fiber laser, a semiconductor laser, or a diode pumped solid state laser. A fiber-based laser system, such as the fiber laser disclosed by the inventors of this application in U.S. Pat. No. 5,887,009, may be used to take advantage of the inherent flexibility of laser cavity parameters. A semiconductor laser may also be desirable as a low cost device.

The angled-dual-axis confocal scanning module of the present invention can also be optically coupled to a light source via a second non-reciprocal, three-port optical circulator. In this embodiment, an output aperture of the light source is optically coupled to a first port of the second optical circulator and a second port of the second optical circulator is in turn optically coupled to the input/output port of the angled-dual-axis confocal scanning module, such that an illumination beam is passed from the light source into the angled-dual-axis confocal scanning module in nearly its entirety. The optical coupling between the second optical circulator and the angled-dual-axis confocal scanning module is preferably provided by a single optical fiber, though other optical coupling means can also be implemented. An observation beam collected by the angled-dual-axis confocal scanning module is then routed to a third port of the second optical circulator, which further leads to a detection path, preferably in the form of a detection optical fiber. An optical detector may be optically coupled to the detection optical fiber. In this angled-dual-axis confocal scanning system, the light source may be any suitable laser or non-laser source, which operates in either continuous or pulsed mode. In fact, a skilled artisan may implement any light source suitable for a given application. Moreover, the non-reciprocal nature of the second optical circulator allows nearly 100% of the observation beam to be used for detection, hence maximizing the signal-to-noise ratio. The system thus described constitutes the fourth angled-dual-axis confocal scanning system of the present invention.

The fourth angled-dual-axis confocal scanning system described above can be further modified into an interferometer configuration, such that the observation beam is combined with a portion of the output beam from the light source to create coherent interference. This can be achieved by inserting a beam-splitting means, such as a fiber-optic coupler or a beamsplitter, between the light source and the second optical circulator. In such an arrangement, the beam-splitting means diverts a portion of the output beam emitted from the light source to the first port of the second optical circulator, which is in turn routed to the angled-dual-axis confocal scanning module, providing an illumination beam. The remainder of the output beam from the light source is diverted to a reference path, preferably in the form of a reference optical fiber, providing a reference beam. The third port of the second optical circulator then routes an observation beam collected by the angled-dual-axis confocal scanning module to a detection path, preferably in the form of a detection optical fiber. The reference and detection optical fibers may be coupled by a 50/50 fiber-optic coupler to mix the observation and reference beams, and produce two outputs with a $\pi$ phase difference for use in a balanced detection scheme. In this way, an interferometer is created and the length of the reference optical fiber can be adjusted to achieve coherent interference between the observation and reference beams.

The system described above, hence the fifth angled-dual-axis confocal scanning system of the present invention, may further include a frequency shifter (or a phase modulator), arranged such that the frequency of either the reference or the observation beam is shifted, so as to generate coherent heterodyne interference between the observation and reference beams. Heterodyne balanced detection technique, well-known in the art of optical coherence tomography (OCT), can be accordingly utilized. An adjustable optical delay device can also be implemented in such a way to maintain coherent interference between the reference and observation beams. If the light source has a short coherence length, then the delay can be adjusted such that only single-scattered light in the observation beam is coherent with the reference beam at the 50/50 fiber-optic coupler and multiple-scattered light, which traverses over a larger optical path length in the observation beam, does not contribute to the coherent interference, therefore providing further filtering of multiple-scattered light. To enhance the signal-to-noise ratio in detection, an optical amplifier, such as a two-port fiber amplifier or semiconductor optical amplifier (SOA), can be coupled to the detection optical fiber, such that the observation beam is amplified. An amplified observation beam also allows faster scanning rates and consequently higher pixel rates without appreciable loss in signal-to-noise ratio, because a shorter integration time per pixel of an image is required in data collection.

The light source in the fifth angled-dual-axis confocal scanning system of the present invention can be an optical fiber amplifier, a semiconductor optical amplifier, a fiber laser, a semiconductor laser, a diode-pumped solid state laser, or a continuous wave or pulsed broadband OCT source having a short coherence length, as is well known in the art. If polarized light is provided by the light source, the beam-splitting means should be a polarizing beamsplitter, such as a polarizing beamsplitter evanescent wave optical fiber coupler, and the various optical fibers in the system should be polarization maintaining (PM) fibers. In this case, the observation and reference beams can be brought into the same polarization by rotation of either the reference or detection optical fiber. Alternatively, a polarization rotation means, such as a Faraday rotator, can be coupled to either the reference or detection optical fiber, such that the reference and observation beams have substantially the same polarization when combined. Furthermore, the 50/50 fiber-optic coupler can be a polarization maintaining fiber coupler to optimally mix the polarized observation and reference beams.

A distinct advantage of the angled-dual-axis confocal scanning microscope of the present invention is that the scanning is achieved by pivoting both the illumination and observation beams, as opposed to moving either the object or the microscope's objective lenses in the prior art confocal theta scanning microscopes, which adversely limits the speed and maneuverability of scanning. Moreover, a single-element scanning means, such as a micro-machined scanning mirror, is used to pivot the illumination and observation beams jointly, in contrast to the prior art systems where the two beams are scanned individually by way of moving the microscope's objectives lenses separately, which requires precise synchronization and coordination in maneuvering the lenses. In addition, by disposing the scanning means between the angled-dual-axis focusing means and the object, fast and high-precision scanning at high resolution is obtained over a large field of view. Such an arrangement takes advantage of the long working distance rendered by using low NA focusing elements (or lenses). Another important advantage gained by using low NA focusing elements is that the illumination and observation beams do not become overlapping until sufficiently close to the focus. This prevents scattered light in one beam from directly "jumping" to another beam, hence eliminating scattered photon noise in the observation beam. Furthermore, low NA lenses can be easily designed for aberration correction, thus allowing diffraction-limited performance at relatively low cost. In the present invention, diffraction-limited focusing is only required "on-axis", hence further simplifying the lens requirements. The angled-dual-axis confocal scanning microscope of the present invention further advantageously exploits the flexibility, scalability and integrity afforded by optical fibers and silicon micro-machining techniques, rendering it a highly versatile and modular device. Accordingly, the angled-dual-axis confocal scanning microscope of the present invention is particularly suited for applications in which high resolution and fast scanning are required, such as in vivo imaging of live tissue for performing optical biopsies in medical applications.

By integrating the angled-dual-axis confocal scanning microscope of the present invention with fiber-optic components and a fiber-coupled laser, the angled-dual-axis confocal scanning systems of the present invention provide a diverse assembly of fiber-based, high resolution and fast scanning systems that can be adapted in a variety of applications, such as in biological and medical imaging, and industrial applications.

The novel features of this invention, as well as the invention itself, will be best understood from the following drawings and detailed description.

DETAILED DESCRIPTION

Although the following detailed description contains many specific details for the purposes of illustration, anyone of ordinary skill in the art will appreciate that many variations and alterations to the following details are within the scope of the invention. Accordingly, the exemplary embodiment of the invention described below is set forth without any loss of generality to, and without imposing limitations upon, the claimed invention.

Figure 1A:
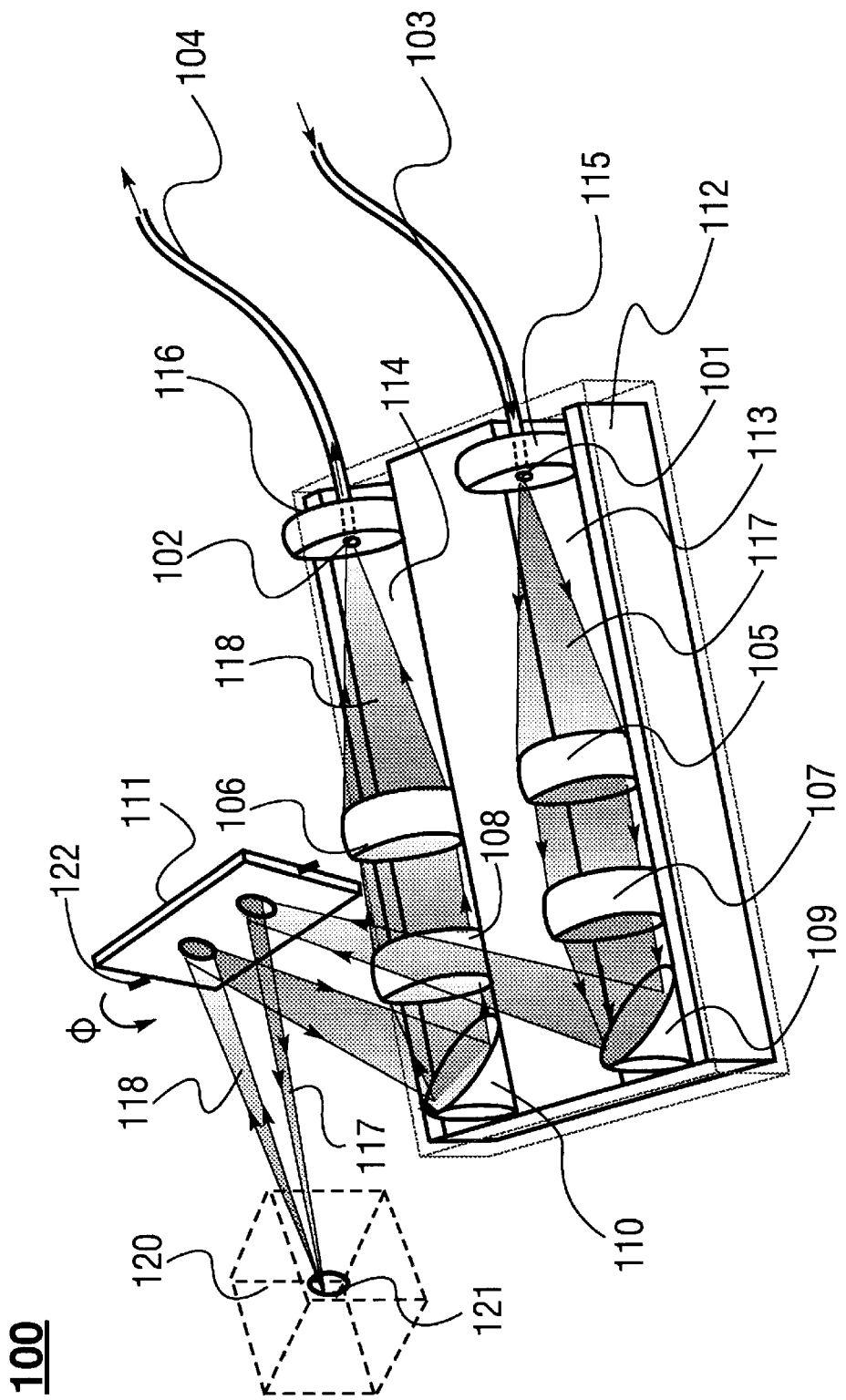
FIGS. 1A–1D shows several exemplary embodiments of an angled-dual-axis confocal scanning head according to the present invention.

FIGS. 1A–1D depict several exemplary embodiments of an angled-dual-axis confocal scanning head according to the present invention. Depicted in FIG. 1A is a first exemplary embodiment of an angled-dual-axis confocal scanning head of the present invention. Confocal scanning head 100, by way of example, comprises a first end 101 of a first optical fiber 103 serving as a point light source; a first end 102 of a second optical fiber 104 serving as a point light detector; an angled-dual-axis focusing means in the form of a lens assembly consisting of first collimating lens 105, second collimating lens 106, illumination lens 107, observation lens 108, and two beam-aligning elements in the form of first 45-degree mirror 109 and second 45-degree mirror 110; a scanning means in the form of a single scanning mirror 111, which can be pivoted about axis 122, and a silicon substrate 112. First collimating lens 105, illumination lens 107, and first mirror 109 are mounted on first V-groove 113 etched on substrate 112. Similarly, second collimating lens 106, observation lens 108, and second mirror 110 are mounted on second V-groove 114 etched on substrate 112. First optical fiber 103 and second optical fiber 104 are affixed to cylindrical ferrules 115 and 116 respectively, which are in turn mounted on V-grooves 113 and 114 respectively, such that fiber ends 101 and 102 are held in their respective positions.

In operation, an illumination beam 117 emerges from first end 101 of first optical fiber 103 and is directed to first collimating lens 105. The collimated beam is then passed onto and focused by illumination lens 107. The focused beam is further deflected by first mirror 109 to scanning mirror 111, which in turn directs the beam to a diffraction-limited illumination focal volume (see FIG. 1B) within an object 120. An observation beam 118 emanated from a diffraction-limited, confocal overlapping volume 121 is first collected by scanning mirror 111, then directed to second mirror 110, which in turn deflects the beam to observation lens 108. Observation beam 118 is then collimated by observation lens 108 and then focused by second collimating lens 106 to first end 102 of second optical fiber 104. Scanning mirror 111 is positioned such that illumination beam 117 and observation beam 118 intersect optimally at an angle ($\theta$) within object 120.

Figure 1B:
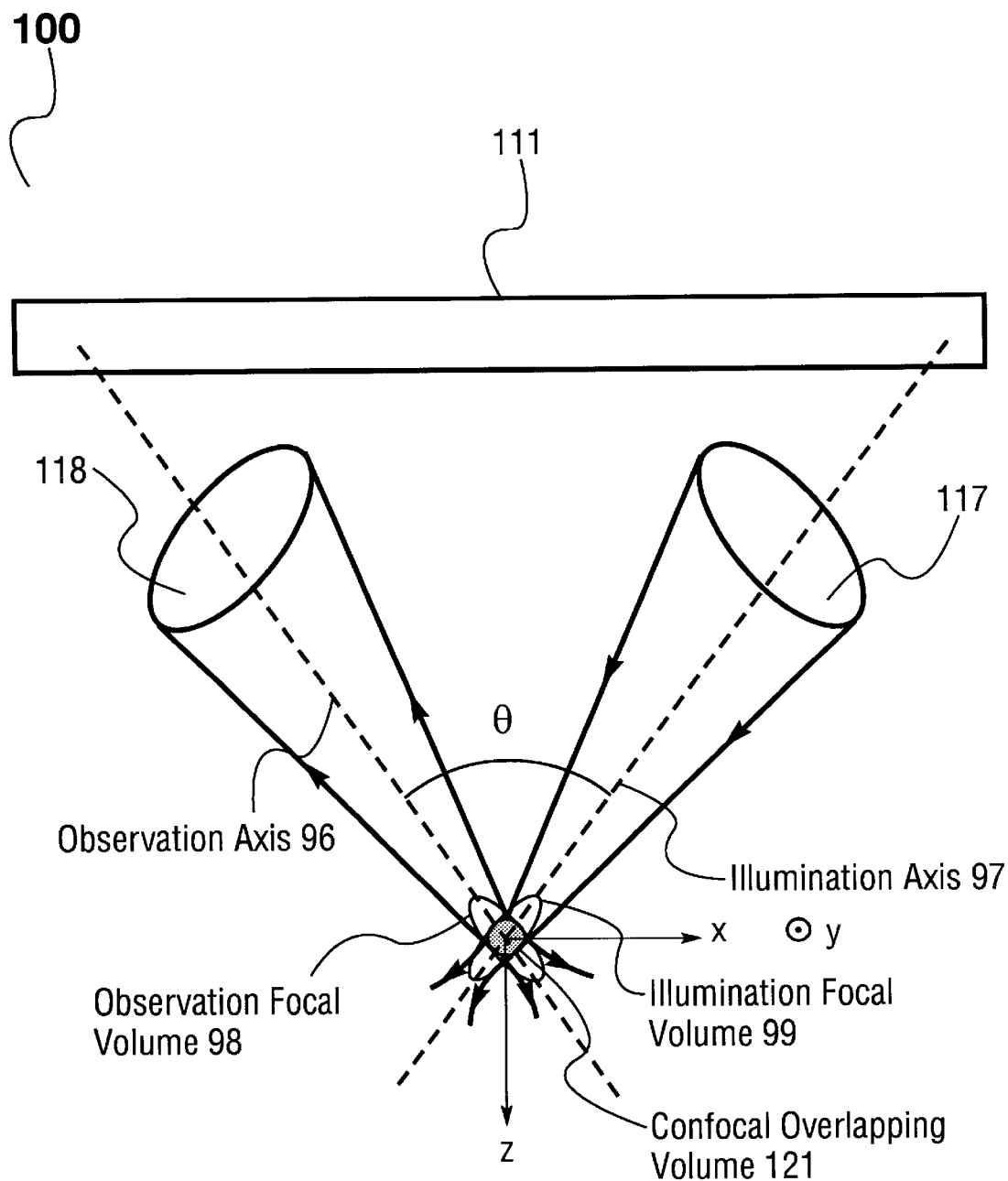

FIG. 1B provides a more detailed illustration of how illumination beam 117 and observation beam 118 are arranged to intersect within object 120 in FIG. 1A. Illumination beam 117, directed by scanning mirror 111, is focused to an illumination focal volume 99 oriented along an illumination axis 97 within object 120. Observation beam 118 emanates from an observation focal volume 98 oriented along an observation axis 96 within object 120. Observation beam 118 is received by scanning mirror 111. Illumination axis 97 and observation axis 96 are directed to intersect at an angle $\theta$, such that illumination focal volume 99 and observation focal volume 98 intersect optimally at confocal overlapping volume 121. A three-dimensional x-y-z coordinate system is provided to describe the spatial extents of confocal overlapping volume 121, where the origin of the coordinate system is set at the center of confocal overlapping volume 121. The z-axis defines the axial (or vertical) direction, whereas x-axis and y-axis (pointing out of the page) represent two orthogonal transverse directions.

It is to be understood that the term "emanating" as used in this specification is to be construed in a broad sense as covering any light transmitted back from the object, including reflected light, scattered light, or fluorescent light. A skilled artisan will know how to selectively make use of a particular type of light collected from the object and filter out spurious background light for a given application.

In the present invention, various optical elements are aberration-corrected, and single-mode optical fibers are used to provide a point light source and detector. Accordingly, illumination focal volume 99 and observation focal volume 98 described above are diffraction-limited, defined by the main lobes of the illumination beam's point-spread function and observation beam's point-spread function. Confocal overlapping volume 121 is likewise diffraction-limited, determined by an optimal overlapping of the main lobes of the illumination beam's point-spread function and the observation beam's point-spread function, as illustrated in FIG. 1B.

The present invention provides a model for calculating the point-spread functions of two optimally intersecting focused beams, such as illumination beam 117 and observation beam 118 exemplified in FIG. 1B, thereby providing an estimate of the three-dimensional extents of the resulting confocal overlapping volume, such as confocal overlapping volume 121. The model calculation is presented as follows.

Figure 7:
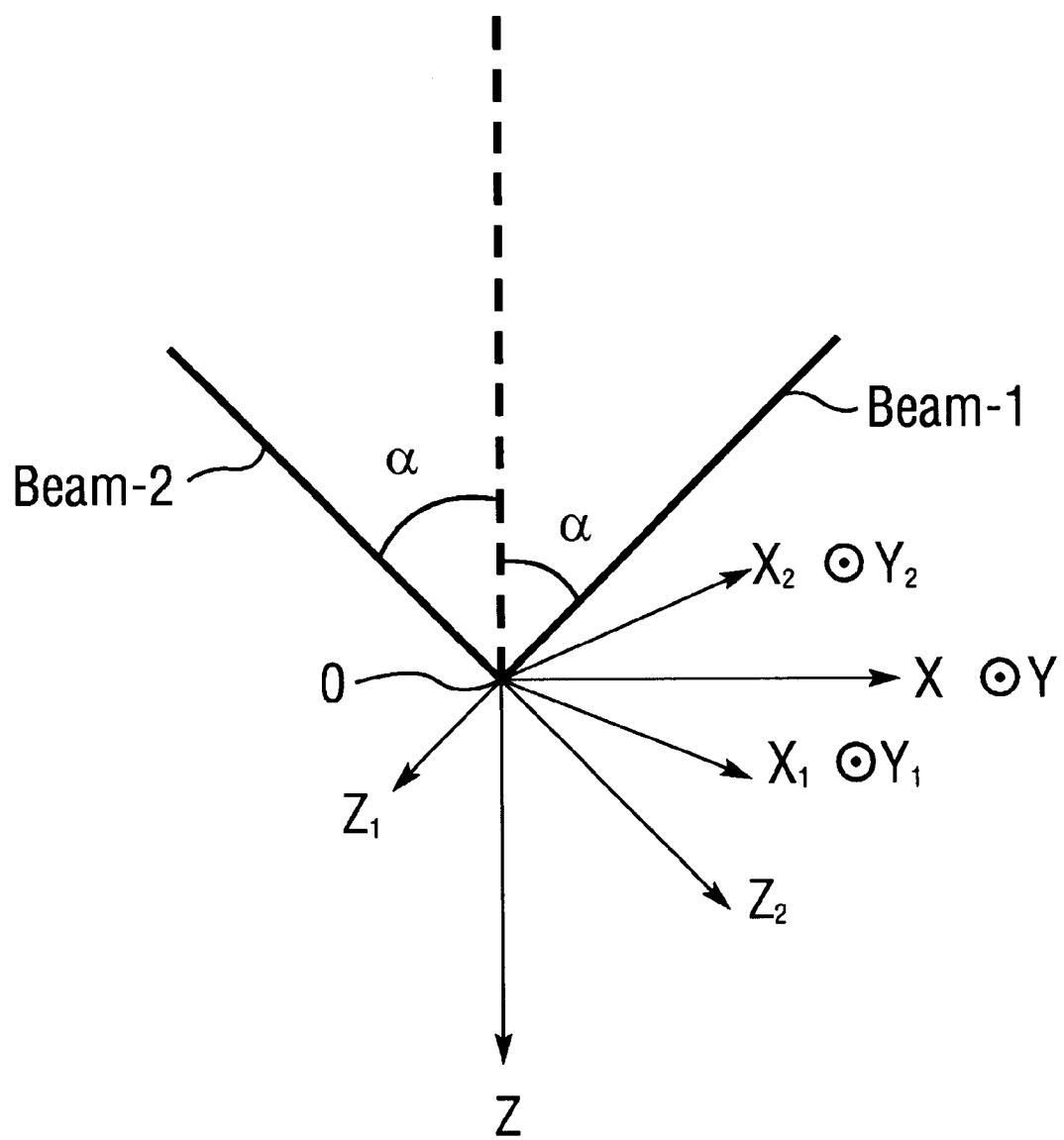
FIG. 7 illustrates a configuration of two intersecting beams according to an embodiment of the present invention.

FIG. 7 illustrates a configuration in which two focused, diffraction-limited beams beam-1, beam-2, intersect at an angle $2\alpha$, where beam-1 and beam-2 can be illumination and observation beams respectively in an angled-dual-axis arrangement described above. A central x-y-z coordinate system is provided, such that z-axis defines the axial (or vertical) direction, and x-axis and y-axis (pointing out of the page) represent two orthogonal transverse directions. There are two additional coordinate systems, where the $x_1$-$y_1$-$z_1$ coordinate system is associated with beam-1 and the $x_2$-$y_2$-$z_2$ coordinate system is associated with beam-2. All three coordinate systems share the same origin O, which is located at the center of the two-beam overlapping region. The transformations between the coordinate systems associated with the beams and the central coordinate system are given by:

$x_1 = x \cos\alpha + z \sin\alpha$ $y_1 = y$ $z_1 = -x \sin\alpha + z \cos\alpha$ $x_2 = x \cos\alpha - z \sin\alpha$ $y_2 = y$ $z_2 = x \sin\alpha + z \cos\alpha$ Using paraxial theory, and assuming that the electric-field associated with each beam is polarized in the y direction (i.e., perpendicular to the page). (It can be shown that for reflection from a perfect mirror or from a small particle, the same results would be obtained for the electric-field to be polarized along the x-z plane). Further introducing normalized notations:

$u_1 = knz_1 \sin^2\theta_0$, $v_1 = knr_1 \sin\theta_0 = kn \sin\theta_0 \sqrt{x_1^2 + y_1^2}$ $u_2 = knz_2 /\sin^2\theta_0$, $v_2 = knr_2/\sin\theta_0 = kn \sin\theta_0 \sqrt{x_2^2 + y_2^2}$ where $\theta_0$ is the maximum ray angle relative to the axis of each of the objective lenses which serve to focus beam-1 and beam-2, $k = 2\pi/\lambda$, and n is the index of refraction of the medium in which beam-1 and beam-2 intersect. Note that NA of each objective lens in air is given by $\sin\theta_0$ (For the sake of simplicity, and without losing any generality, the two objective lenses are assumed to have the same NA.)

Figure 8A:
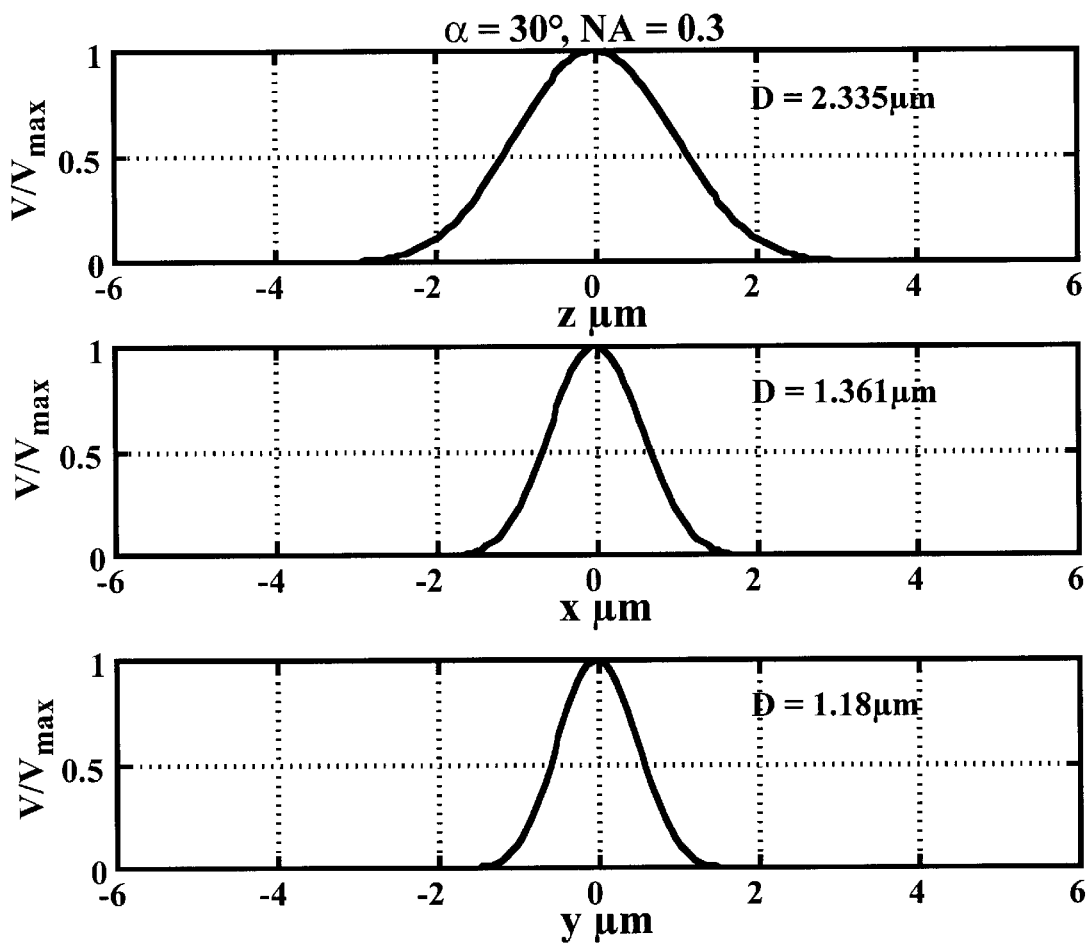
FIGS. 8A–8C show graphs of normalized confocal-signal as a function of position in the x, y, z directions according to exemplary embodiments of the present invention.
Figure 8B:
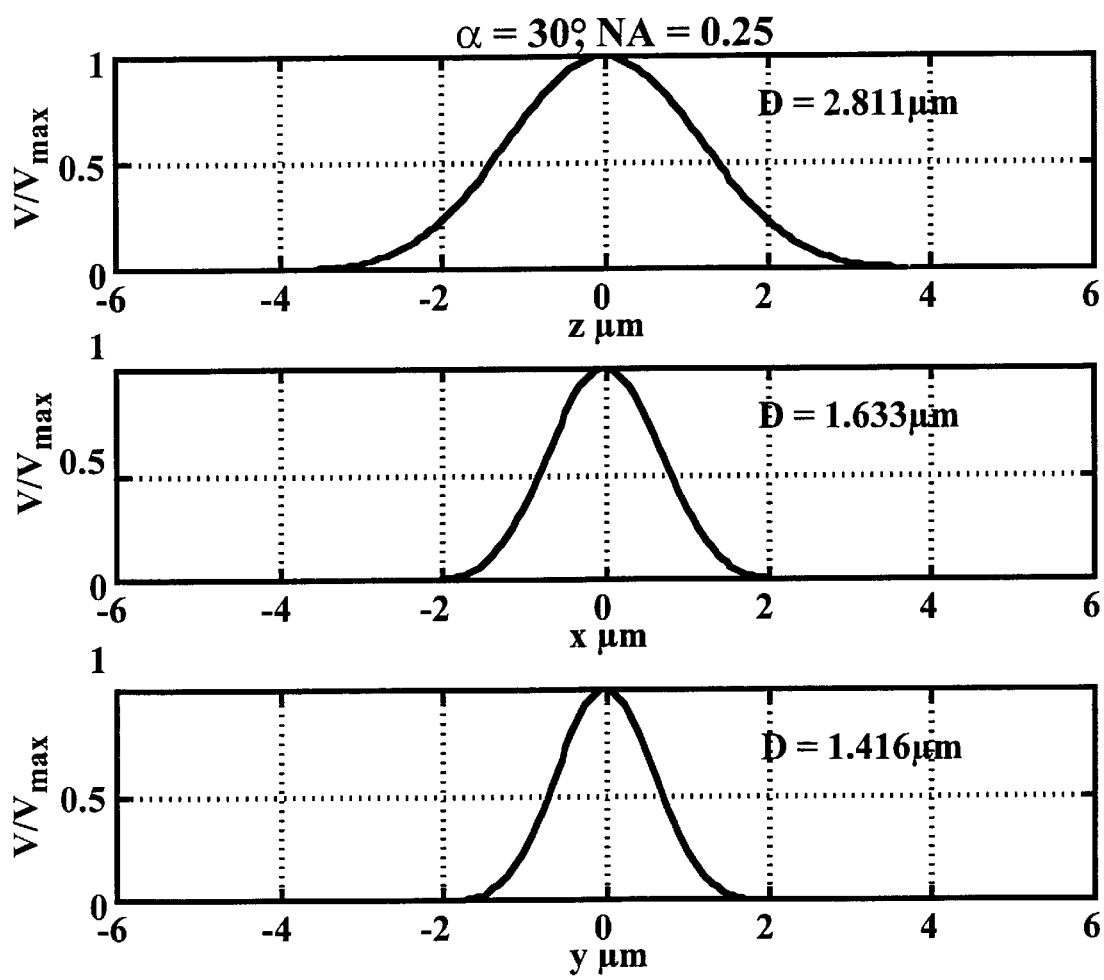
Figure 8C:
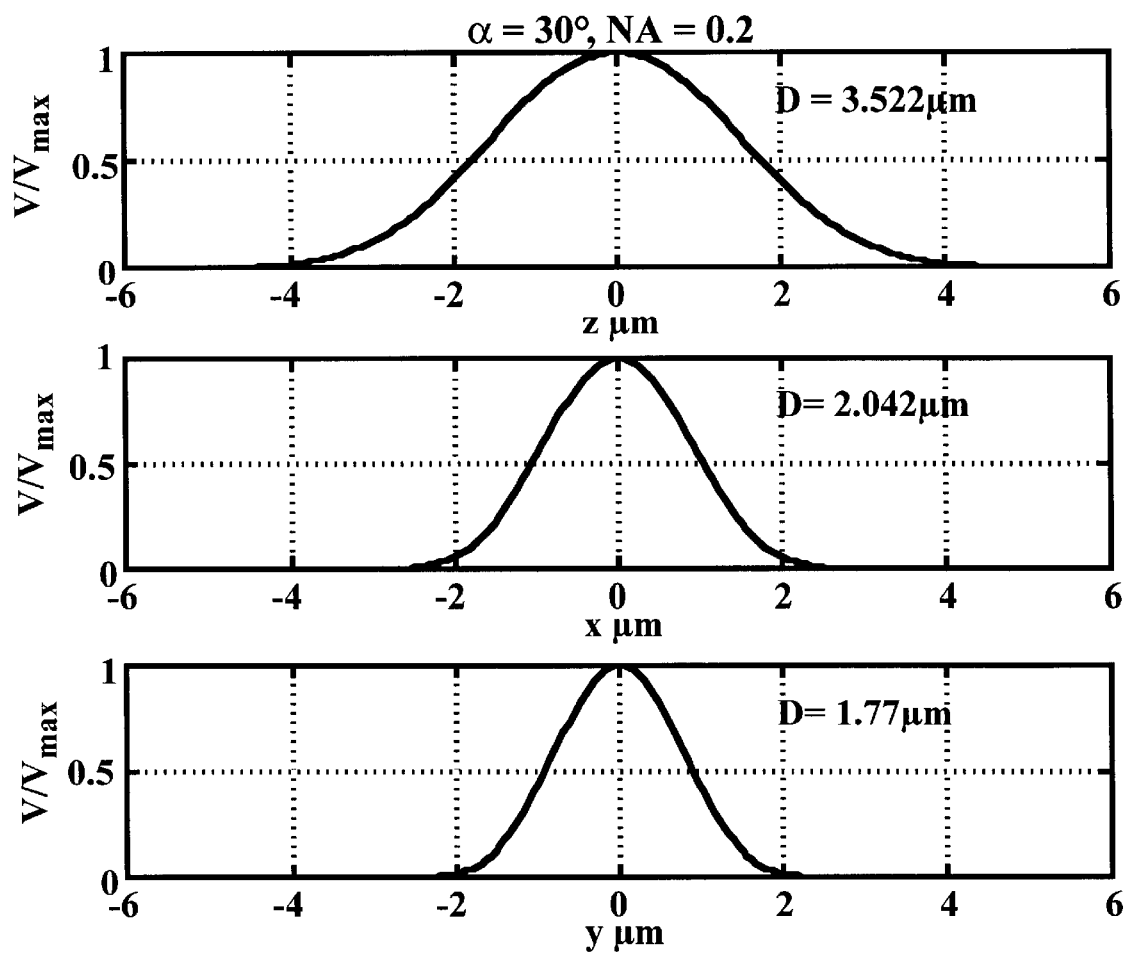

It can be shown (e.g., see "Principles of Optics" of Max Born and Emil Wolf, Pergamon Press, 1980, pp. 437) that the amplitude at point (x, y, z) associated with beam-1 in the two-beam overlapping region is proportional to $U_1 = \int_0^1 J_0(\rho v_1) e^{-j u_1 \rho^2/2} \rho d\rho$ Similarly, the amplitude associated with beam-2 at the same point (x, y, z) is proportional to $U_2 = \int_0^1 J_0(\rho v_2) e^{31 j u_2 \rho^2/2} \rho d\rho$ It follows that the "confocal-signal", resulting from the overlap of beau-1 and beam-2, is proportional to $V = (U_1 U_2)^2$ FIGS. 8A–8C each display three graphs of normalized "confocal-signal" $V/V_{max}$ plotted as a function of x, y, and z respectively, where the origin of each graph corresponds with the origin O of the x-y-z coordinate system. These graphs are provided by the model calculation described above, for several exemplary cases having different values of the intersecting angle $2\alpha$ and NA of the objective lenses. It is assumed that $\lambda = 1.3$ $\mu$m and n=1.35 in all the cases. A distinct feature prevalent in all the graphs shown in FIGS. 8A–8C is that $V/V_{max}$ exhibits a Gaussian-like shape in each spatial dimension, diminishing rapidly and monotonically (i.e., there are no additional side-lobes) with increasing distance from the center of the two-beam overlapping region. Such characteristics define a sharp resolution in both the axial as well as transverse directions. In fact, the full width of each Guassian-like curve at half of its maximum amplitude, D, provides a measure of the spatial extent of the confocal overlapping volume, hence the spatial resolution, in the given direction for the particular case in consideration. For comparison purpose, the D values obtained for the exemplary cases as well as a few others are listed in TABLE I shown below.

TABLE I

| NA | $\alpha$ | D ($\mu$m) x-direction | D ($\mu$m) y-direction | D ($\mu$m) z-direction |
|---|---|---|---|---|
| 0.3 | 30° | 1.36 | 1.18 | 2.34 |
| 0.25 | 30° | 1.63 | 1.42 | 2.81 |
| 0.2 | 30° | 2.04 | 1.77 | 3.52 |
| 0.3 | 36° | 1.46 | 1.18 | 1.99 |
| 0.2 | 36° | 2.19 | 1.77 | 3.00 |
| 0.3 | 45° | 1.66 | 1.18 | 1.66 |
| 0.2 | 45° | 2.50 | 1.77 | 2.50 |

Now referring back to FIG. 1A, by rotating about axis 122 at a variable angle $\phi$, scanning mirror 111 is further capable of pivoting illumination beam 117 and observation beam 118 jointly in such a way that illumination beam 117 and observation beam 118 remain intersecting optimally at angle $\theta$ ($=2\alpha$) and nonfocal overlapping volume 121 at the intersection of the two beams moves along an arc-line within object 120, thereby producing an arc-line scan.

It should be noted that an important characteristic of the arc-line scan described above is that the relative spatial orientation between illumination beam 117 and observation beam 118 stays fixed in the course of the entire scan, once the two beams are arranged to intersect in an optimal manner initially. This is in distinct contrast to the prior art confocal theta scanning systems, where the illumination and observation beams need to be separately adjusted at each scan point, in order to ensure an optimal intersection. Consequently, the scans performed by angled-dual-axis confocal scanning head 100 of the present invention are inherently of higher precision and faster speed, and are also less laborious to carry out. Another notable feature of angled-dual-axis confocal scanning head 100 of the present invention is that the illumination and observation beam paths can be exchanged, without affecting its performance.

Figure 1C:
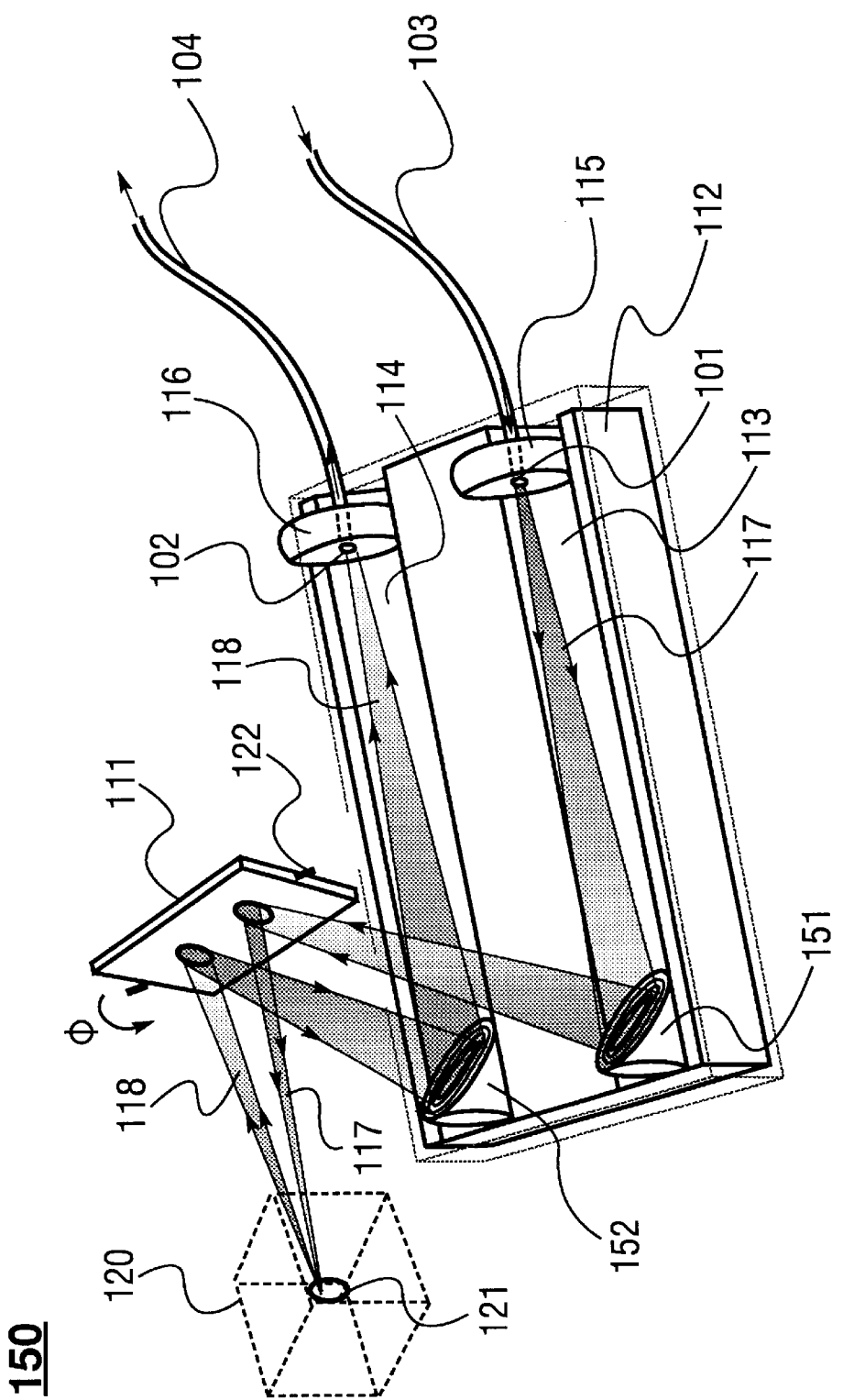

FIG. 1C shows a second exemplary embodiment of an angled-dual-axis confocal scanning head of the present invention. In angled-dual-axis confocal scanning head 150, an illumination reflective focusing element 151 is implemented to replace first collimating lens 105, illumination lens 107, and first mirror 109 in FIG. 1A, providing a dual function of focusing and deflecting illumination beam 117. Likewise, an observation reflective focusing element 152 is used to replace second mirror 110, observation lens 108, and second collimating lens 106 in FIG. 1A, providing a dual function of focusing and deflecting observation beam 118. The remainder of angled-dual-axis confocal scanning head 150 shares the same components with angled-dual-axis confocal scanning head 100 in FIG. 1A. By way of example, illumination and observation reflective focussing elements 151, 152 are in the form of two diffractive lenses with reflective coatings. The proper design of such reflective diffraction lenses can be determined by commercially available computer modeling programs and is well known in the art of diffractive lens design. Illumination and observation reflective focusing elements 151, 152 can alternatively be in the form of curved mirrors. In some cases of using curved mirrors such as ellipsoidal mirrors (each having two foci), it is desirable to place fiber ends 101, 102 at the respective first focal points of the two ellipsoidal mirrors serving as illumination and observation focusing elements 151, 152, thereby focusing illumination beam 117 and observation beam 118 at the respective second focal points of focusing elements 151, 152. All in all, the overall operation of angled-dual-axis confocal scanning head 150 is similar to the working of angled-dual-axis confocal scanning head 100, as described above.

Figure 1D:
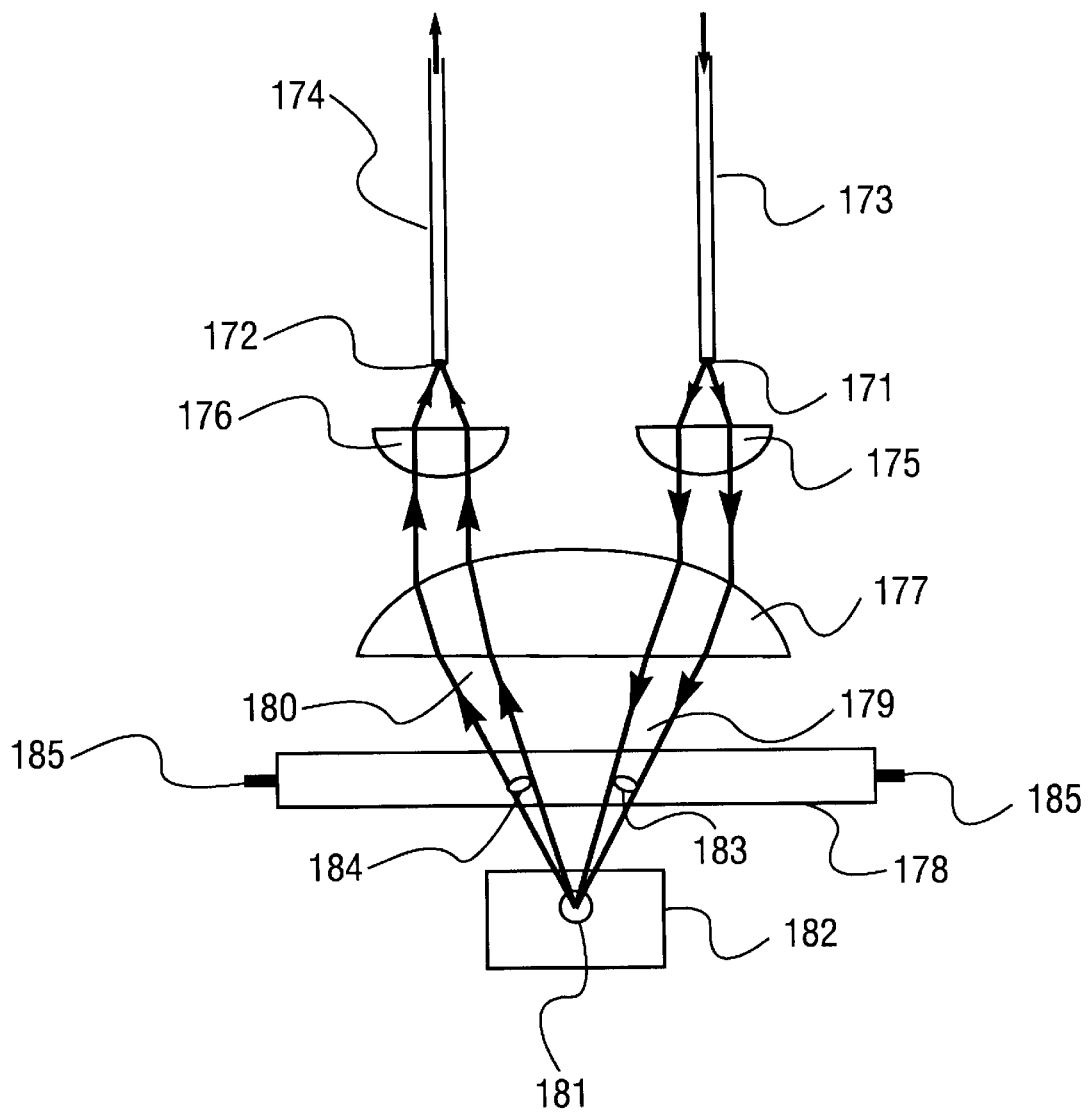

FIG. 1D depicts a simplified schematic illustration of a third exemplary embodiment of an angled-dual-axis confocal scanning head of the present invention. Angled-dual-axis confocal scanning head 170 comprises a first end 171 of a first optical fiber 173 serving as a point light source; a first end 172 of a second optical fiber 174 serving as a point light detector; an angled-dual-axis focusing means in the form of a lens assembly consisting of first collimating lens 175, second collimating lens 176, and illumination-observation lens 177; and a scanning means in the form of a single scanning mirror 178 having a pivoting axis 185.

In operation, an illumination beam 179 emerges from first end 171 of first optical fiber 173 and is directed to first collimating lens 175. The collimated beam is then passed onto and focused by illumination-observation lens 177. The focused beam reflects off scanning mirror 178 at first impingement spot 183, and is further directed to a diffraction-limited illumination focal volume (not shown in FIG. 1D) within an object 182. An observation beam 180 emanated from a diffraction-limited, confocal overlapping volume 181 is first received by scanning mirror 178 at second impingement spot 184, further passed onto and collimated by illumination-observation lens 177. Observation beam 180 is then focused by second collimating lens 176 to first end 172 of second optical fiber 174. Scanning mirror 178 is positioned such that illumination beam 179 and observation beam 180 intersect optimally at an angle ($\theta$) within confocal overlapping volume 181, as illustrated in FIG. 1B. By rotating about axis 185, scanning mirror 178 is further capable of pivoting illumination beam 179 and observation beam 180 jointly in such a way that illumination beam 179 and observation beam 180 remain intersecting optimally at angle $\theta$ and confocal overlapping volume 181 at the intersection of the two beams moves along an arc-line within object 120, thereby producing an arc-line scan, as in the embodiment of FIG. 1A or FIG. 1C.

It should be noted that in an angled-dual-axis arrangement of the present invention, as the above exemplary embodiments depict, since the observation beam is positioned at an angle relative to the illumination beam, scattered light along the illumination beam does not easily get passed into the observation beam, except where the beams overlap. This substantially reduces scattered photon noise in the observation beam, thus enhancing the sensitivity and dynamic range of detection. This is in contrast to the direct coupling of scattered photon noise between the illumination and observation beams in a transmission or reciprocal confocal microscope, due to the collinear arrangement between the beams. Moreover, by using low NA focusing elements (or lenses) in an angled-dual-axis confocal scanning system of the present invention, the illumination and observation beams do not become overlapping until very close to the focus. Such an arrangement prevents scattered light in the illumination beam from directly "jumping" to the observation beam, hence further filtering out scattered photon noise in the observation beam. Altogether, the angled-dual-axis confocal system of the present invention has much lower noise and is capable of providing much higher contrast when imaging in a scattering medium than the prior art confocal systems employing high NA lenses, rendering it highly suitable for imaging within biological specimens.

FIGS. 1A, 1C–1D serve to illustrate only three of many embodiments of an angled-dual-axis confocal scanning head of the present invention. In general, the angled-dual-axis focusing means in an angled-dual-axis confocal scanning head of the present invention comprises an assembly of one or more elements for beam focusing, collimating, aligning, and deflecting, as exemplified in FIGS. 1A, 1C–1D. Such elements can be in the form of refractive lenses, diffractive lenses, GRIN lenses, focusing gratings, micro-lenses, holographic optical elements, binary lenses, curved mirrors, flat mirrors, prisms and the like. A crucial feature of the angled-dual-axis focusing means is that it provides an illumination axis and an observation axis that intersect at an angle, as illustrated in FIG. 1B. The scanning means in an angled-dual-axis confocal scanning head of the present invention generally comprises an element selected from the group consisting of mirrors, reflectors, acousto-optic deflectors, electro-optic deflectors, mechanical scanning mechanisms, and Micro-Electro-Mechanical-Systems (MEMS) scanning micro-mirrors. A key feature is that the scanning means is in the form of a single element, as opposed to two or more separately functioning scanning elements in prior art confocal scanning systems. A preferred choice for the scanning means is a flat pivoting mirror, particularly a silicon micro-machined scanning mirror for its compact and light-weight construction. (Note: to achieve faster scanning, the scanning means can be in the form of two smaller coplanar pivoting mirrors, such as two silicon micro-machined scanning mirrors. Owing to their unique fabrication process, these mirrors can be operated in substantially synchronous motion and constructed to co-rotate about a common axis so as to scan illumination and observation beams in a way functionally equivalent to a larger single scanning mirror.) The fabrication processes of silicon scanning mirrors are described in U.S. Pat. Nos. 6,007,208, 6,057,952, 5,872,880, 6,044,705, 5,648,618, 5,969,465 and 5,629,790. The optical fibers in an angled-dual-axis confocal scanning head of the present invention can be single-mode fibers, multi-mode fibers, birefrigent fibers, polarization maintaining fibers and the like. Single-mode fibers are preferable, however, for the ends of single-mode fibers provide a nearly point-like light source and detector.

A unique feature of the angled-dual-axis confocal scanning head of the present invention is that the scanning means is placed between the angled-dual-axis focusing means and the object to be examined. This enables the best on-axis illumination and observation point-spread functions to be utilized throughout the entire angular range of an arc-line scan, thereby providing greater resolution over a larger transverse field of view, while maintaining diffraction-limited performance. Such an arrangement is made possible by taking advantage of the longer working distance rendered by using relatively lower NA focusing elements or lenses in the angled-dual-axis focusing means. For example, the present invention uses molded aspherical lenses with NA in the range of 0.1 to 0.4 that are low cost and readily available in the art. Such lenses have excellent on-axis aberration correction, and are therefore diffraction-limited for on-axis focusing conditions. These lenses normally do not have diffraction-limited performance when focusing off-axis, and thus cannot be used in confocal scanning systems where off-axis performance is important. Such is the case in prior art confocal scanning systems described in U.S. Pat. Nos. 5,973,828 and 6,064,518, where the field of view is limited by the off-axis performance of objective lenses.

Moreover, the specific arrangements among various optical elements and optical fibers in an angled-dual-axis confocal scanning head can be altered in many ways without deviating from the principle and the scope of the present invention. For instance, the use of collimating lenses and beam-aligning mirrors, such as those in FIG. 1A to help facilitate the shaping and alignment of the illumination and observation beams, can be optional and vary with the nature of practical applications. Other auxiliary optical elements may also be implemented in an angled-dual-axis confocal scanning head of the present invention, to enhance the overall performance. All in all, a skilled artisan will know how to design an angled-dual-axis confocal scanning head in accordance with the principle of the present invention, to best suit a given application.

By integrating its constituent optical elements on a silicon substrate, as exemplified in FIGS. 1A, 1C by way of silicon fabrication techniques, the angled-dual-axis confocal scanning head of the present invention renders a high degree of integrity, maneuverability, scalability, and versatility. Such a design also provides greater flexibility and higher precision in the alignment of various optical elements. Although the particular way of making an angled-dual-axis confocal scanning head of the present invention an integrated device is dictated by the nature of a given application, a silicon substrate is generally preferred, for it is well known in the art that various V-grooves can be etched on silicon in a very precise manner, as demonstrated in U.S. Pat. No. 6,007,028. The precision of the V-grooves provides an accurate and secure optical alignment among various optical elements hosted by these V-grooves, enabling the angled-dual-axis confocal scanning head thus constructed to be a reliable and modular device. Using the embodiment of FIG. 1A as a way of example, mirrors 109, 110 can be rotated about their respective axes and translated along V-grooves 113, 114, respectively, to facilitate the optimal intersection of illumination and observation beams 117, 118. Illumination and observation lenses 107, 108 can also be translated along V-grooves 113, 114 respectively, to further facilitate the optimal overlapping of illumination and observation focal volumes 99, 98 as illustrated in FIG. 1B. Such alignment procedures can be performed before affixing (e.g., by way of gluing) various optical elements to their respective V-grooves. The scalability and relatively low cost of silicon fabrication technology add further advantages to this approach. For example, a micro-optic version of such an integrated angled-dual-axis confocal scanning head can be incorporated in miniature surgical devices, endoscopes, or other in situ devices, suitable for medical applications.

Figure 2A:
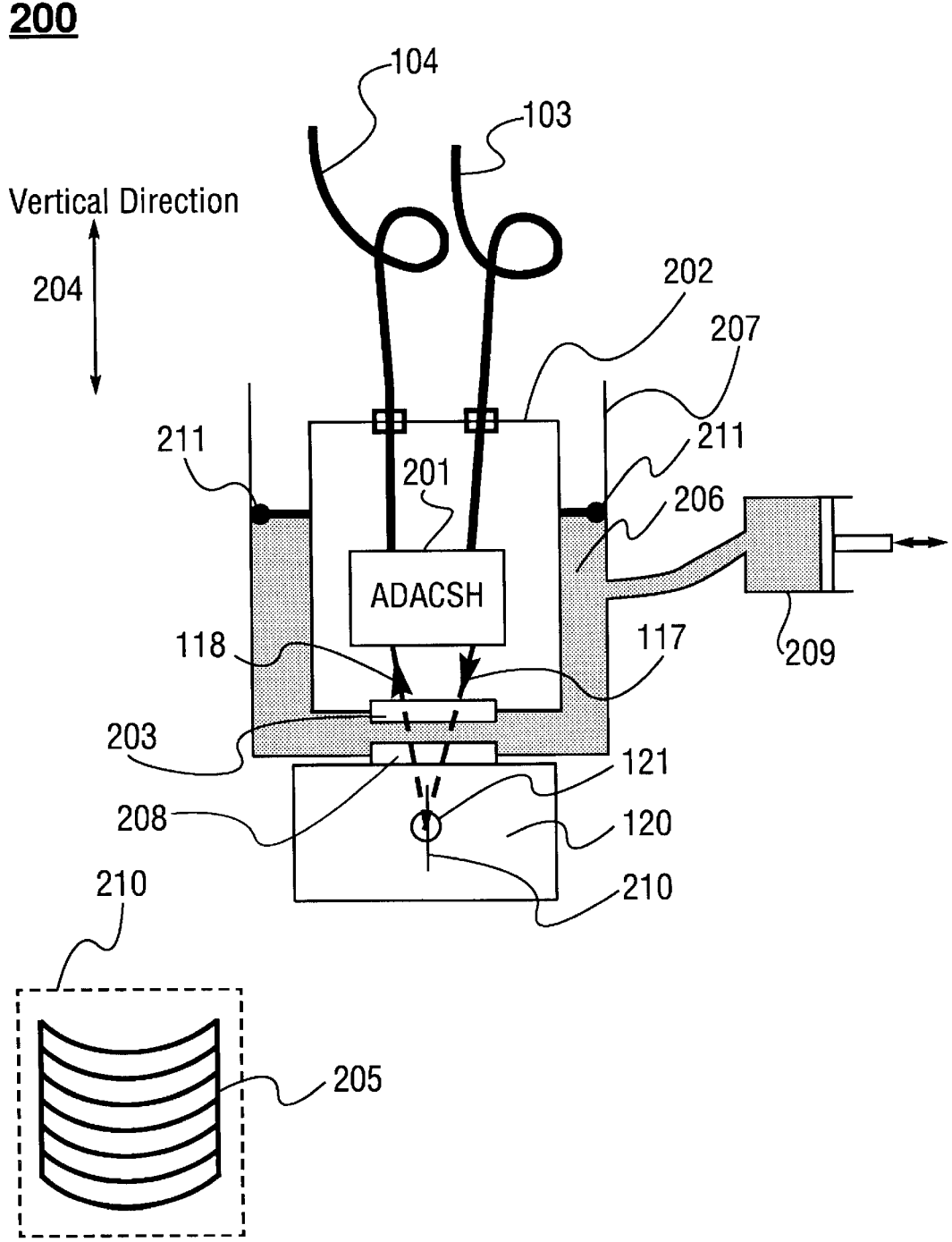
FIGS. 2A–2B depict two exemplary embodiments of an angled-dual-axis confocal scanning microscope according to the present invention.

To provide a two-dimensional scan, an angled-dual-axis confocal scanning head of the present invention can be mechanically coupled to a vertical scanning unit, comprising a vertical translation means and a compensation means. The vertical translation means causes the angled-dual-axis confocal scanning head to move toward or away from the object and hence the illumination and observation beams to probe further into the interior of the object, thereby producing a vertical scan. A two-dimensional vertical cross-section scan of the object is then obtained by assembling a plurality of arc-line scans that progressively deepen into the object. The compensation means keeps the optical paths lengths of the illumination and observation beams substantially unchanged, thereby ensuring the optimal intersection of the illumination and observation focal volumes in the course of vertical cross-section scans. The combination of the angled-dual-axis confocal scanning head and the corresponding vertical scanning unit constitutes an angled-dual-axis confocal scanning microscope employing vertical cross-section scanning. FIG. 2A depicts an exemplary embodiment of an angled-dual-axis confocal scanning microscope of the present invention. Angled-dual-axis confocal scanning microscope 200, by way of example, comprises an angled-dual-axis confocal scanning head (ADACSH) 201 and a movable carriage 202. For the purpose of illustration, angled-dual-axis confocal scanning head 201 is in a simplified schematic form of the embodiment shown in FIG. 1A (or FIG. 1C), although any other embodiments according to the present invention can be equivalently utilized. In the embodiment of FIG. 2A, angled-dual-axis confocal scanning head 201 is attached to and further enclosed in movable carriage 202, with optical fibers 103, 104 extending to the outside of movable carriage 202. A first transparent window 203 is mounted on movable carriage 202 for passage of illumination beam 117 and observation beam 118. Movable carriage 202 can move up and down in a vertical direction as defined by arrow 204, causing angled-dual-axis confocal scanning head 201 to move toward or away from object 120 in the process. By doing so, confocal overlapping volume 121 of illumination beam 117 and observation beam 118 further deepen into (or retract from) the interior of object 120, whereby a succession of arc-line scans that progressively deepen into object 120 along a vertical cross-section plane 210 is produced, as illustrated by curves 205. The motion of movable carriage 202 can be driven by a variety of means, for instance, by coupling it to a motor (not shown in FIG. 2A) that is activated by a magnetic, hydraulic, piezoelectric, or other actuator. A skilled artisan can accordingly implement a movable stage suitable for a given application.

As illumination beam 117 and observation beam 118 deepen into the interior of object 120 in the course of vertical scanning, the change in their respective optical path lengths becomes increasingly large, which may cause their respective focal volumes to no longer intersect in an optimal manner, or even not to intersect at all at the point where the two beams physically meet. Furthermore, in interferometry applications such as optical coherence microscopy, the optical path lengths of illumination beam 117 and observation beam 118 must stay substantially fixed in order to generate coherent interference of predominantly singly scattered light. To maintain the optical path lengths of illumination beam 117 and observation beam 118 during vertical scanning, the space between movable carriage 202 and object 120 can be filled with a substantially transparent fluid 206 having an index of refraction that is substantially the same as the index of refraction of object 120, such that the optical path lengths of illumination beam 117 and observation beam 118 remain unchanged in the course of vertical scanning. The use of optical fibers further provides the necessary flexibility that enables the whole assembly of angled-dual-axis confocal scanning head 201 and movable carriage 202 to move up and down without incurring additional change in the optical path lengths of illumination beam 117 and observation beam 118. In the embodiment of FIG. 2A, movable carriage 202, along with angled-dual-axis confocal scanning head 201, is disposed within a container 207 filled with fluid 206. An O-ring seal 211 is provided to seal fluid 206 inside container 207, while still permitting movable carriage 202 to move up and down relative to container 207. Container 207 is equipped with a second transparent window 208, in optical alignment with first transparent window 208 for passage of illumination and observation beams 117, 118.

Container 207 is further connected to a fluid injection system 209, serving as a reservoir for replenishing additional fluid or receiving excess fluid as movable carriage 202 is moving towards or away from object 120. For imaging of human tissue and other biological samples, fluid 206 can be water, which has an index of refraction closely matching that of tissue and biological samples.

It should be noted that certain aberrations of the illumination and observation beams may occur as a result of successive passages of the beams through first and second transparent windows 203, 208, fluid 206, and object 120 in the above embodiment, which may require specific designs of the illumination and observation focusing elements that are corrected for these aberrations. Alternatively, auxiliary optical elements that are properly designed for correcting such aberrations may be implemented in the angled-dual-axis focusing means. In most cases of a converging beam passing through a window or into another object at an inclined angle, the primary aberrations to be corrected for will be spherical aberration, astigmatism, and coma. The magnitude of these aberrations depend upon many factors, and typically increases with NA of the focusing elements, the index of refraction and the thickness of the window, and the angle of incidence. The design of such aberration-corrected focusing elements, or auxiliary optical elements for correcting aberrations, can be accomplished by a lens designer of ordinary skill and with the help of an optical design computer program such as Zemax™.

In applications where NA of the focusing elements are sufficiently low and the thicknesses of windows, fluid and object through which the illumination and observation beams successively traverse are not large, the aberrations would be small and may not need to be corrected. In such cases, the embodiment shown in FIG. 2A can be utilized, which may incorporate additional remedies for further minimizing aberrations. Such remedies include, for example, using windows made of Teflon AF™ or other materials that are transparent and have an index of refraction closely matching that of water.

Figure 2B:
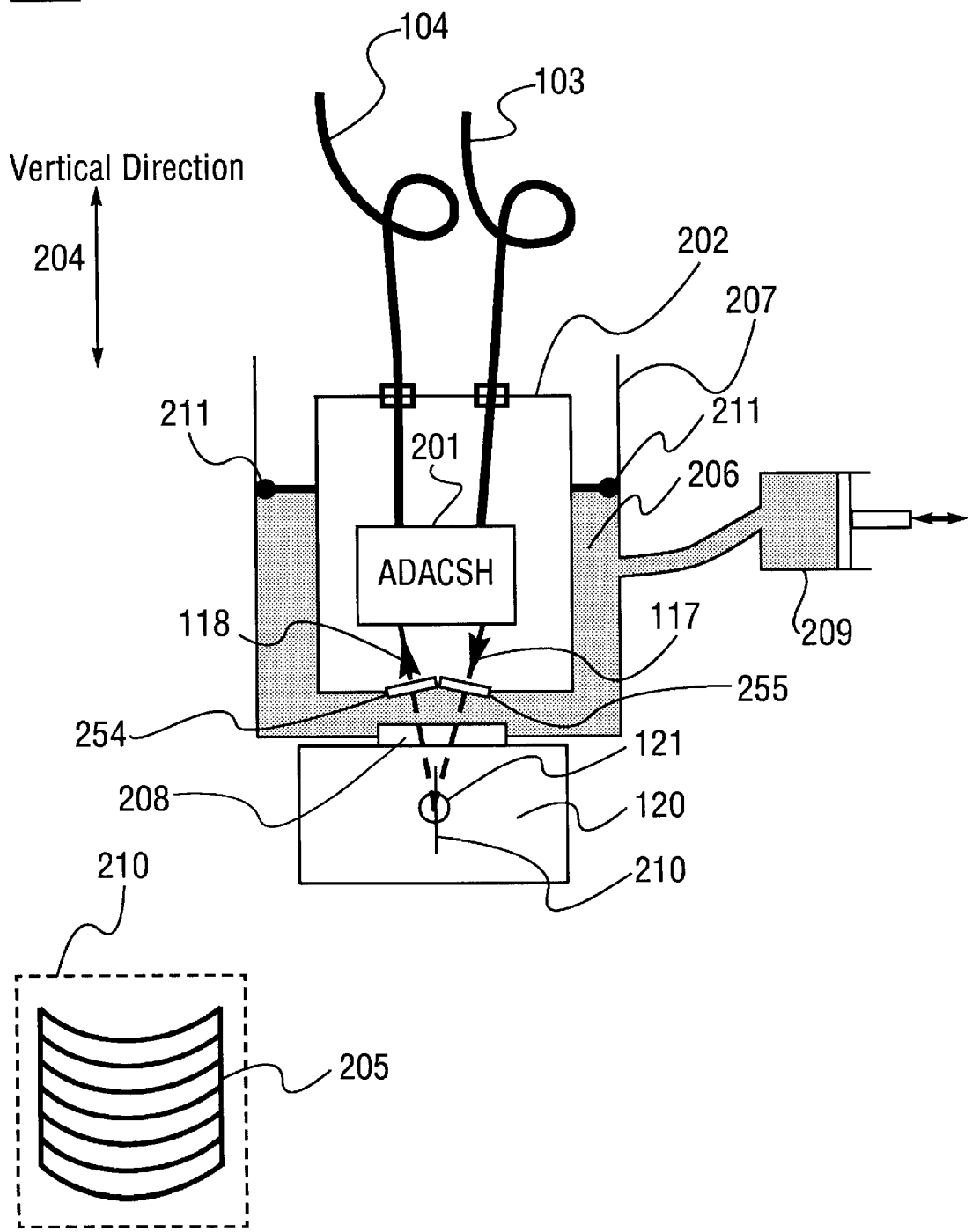

FIG. 2B depicts a second embodiment of an angled-dual-axis confocal scanning microscope of the present invention, pertaining to applications where the aforementioned aberrations may not be negligible. In angled-dual-axis confocal scanning microscope 250, a window assembly comprising two flat transparent windows 254, 255 in an angled arrangement is implemented to replace single flat window 203 in FIG. 2A. The remainder of angled-dual-axis confocal scanning microscope 250 shares the same components as angled-dual-axis confocal scanning microscope 200 shown in FIG. 2A. The window assembly is designed such that illumination axis 97 along with illumination beam 117 and observation axis 96 along with observation beam 118 (see FIG. 1B) are substantially perpendicular to flat windows 255, 254, respectively. As such, the window assembly can greatly reduce coma and astigmatism that would otherwise be associated with using a single flat window (such as window 203 in FIG. 2A). Although spherical aberrations still need to be corrected for in this case, the techniques for making such corrections are well known in the art of lens design. For instance, a skilled artisan can make use of the design of microscope objectives that are corrected for glass coverslips of a certain thickness to accomplish this task.

All in all, the angled-dual-axis confocal scanning microscope of the present invention is designed such that it provides a vertical cross-section scan of an object with enhanced axial resolution, faster speed, and larger transverse field of view. Moreover, by moving the angled-dual-axis confocal scanning microscope, or translating the object, in a transverse direction perpendicular to vertical cross-section plane 210 illustrated in FIG. 2A (or FIG. 2B), a series of vertical cross-section scans can be taken in a layer-by-layer fashion, which can be assembled to provide a three-dimensional volume image of the object.

For tissue imaging applications, the wavelength of light generally ranges from about 0.8 microns to 1.6 microns, since biological tissue samples are particularly transparent in this range. Embodiments of the angled-dual-axis confocal scanning microscope of the present invention are capable of achieving a resolution of about 1–5 microns in the axial (e.g., the vertical direction shown in FIG. 2A) as well as the transverse directions, by use of illumination and observation lenses with NA typically ranging from 0.1 to 0.4, and the intersecting angle θ typically ranging from 45° to 90°. The vertical cross-section scan area is on the order of about 0.5–1 millimeter in both directions. In terms of scanning capabilities, the fast scan rate along an arc-line typically ranges from 1 to 10 KHz, and the maximum rotation angle (e.g., $\phi$ in FIG. 1A) from a neutral position of the scanning mirror (e.g., scanning mirror 111 in FIG. 1A) may range from one to several degrees. Generally, the smaller and the lighter the scanning mirror, the faster the scanning rate. For instance, using a silicon micro-machined scanning mirror can provide scanning rates greater than 10 kHz. The vertical scanning can be performed at a slower rate of 10–60 Hz, which defines the frame rate of vertical cross-section scanning and is in the range of video-rate scanning.

The specific numbers provided above are designed for tissue imaging, to illustrate the utility and the performance of the present invention as a way of example. A skilled artisan can utilize the model calculation described above to design an angled-dual axis confocal scanning microscope in accordance with the present invention, for a given application.

Figure 3A:
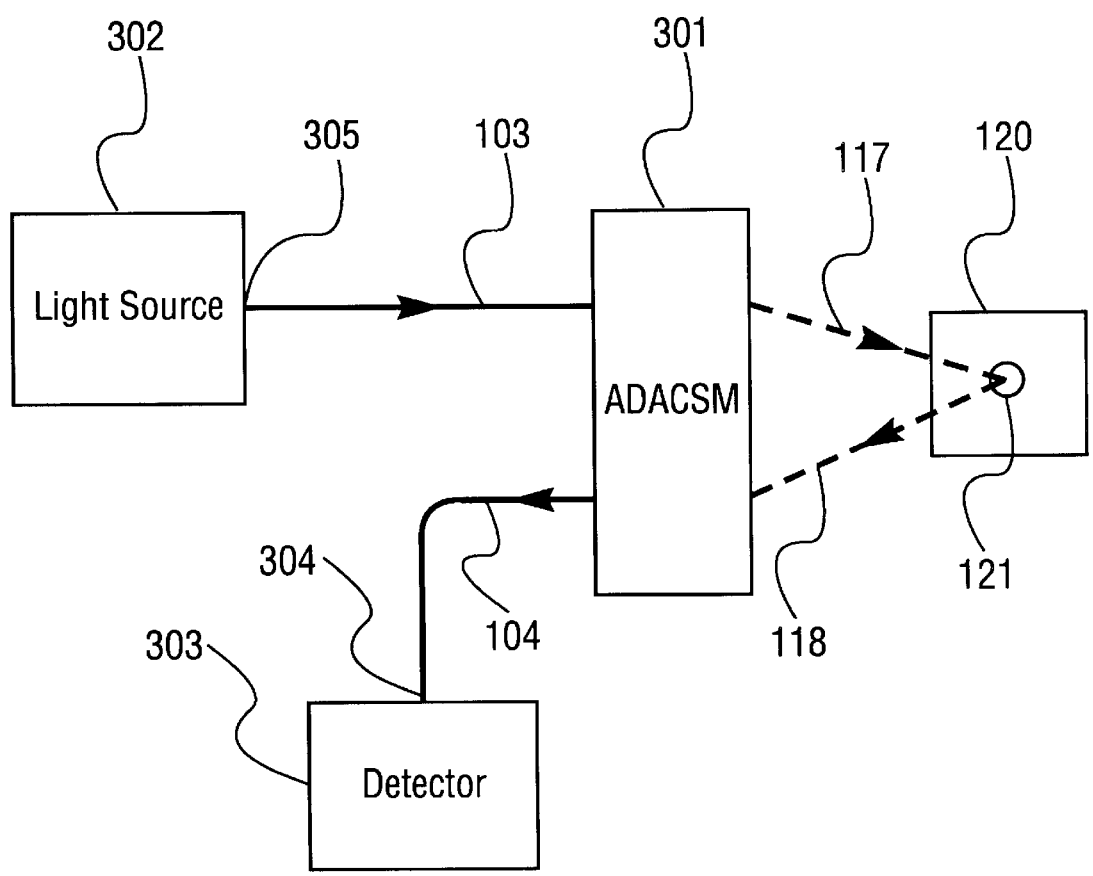
FIGS. 3A–3B show two exemplary embodiments of a first angled-dual-axis confocal scanning system according to the present invention.

FIG. 3A depicts an exemplary embodiment of a first angled-dual-axis confocal scanning system of the present invention. Angled-dual-axis confocal scanning system 300 comprises an angled-dual-axis confocal scanning microscope (ADACSM) 301, a light source 302, and an optical detector 303. By way of example, angled-dual-axis confocal scanning microscope 301 is in a simplified schematic form of one of the embodiments shown in FIGS. 2A–2B. Any other embodiment in accordance with the present invention can be alternatively implemented. Light source 302 is optically coupled to a second end 305 of first optical fiber 103, to provide an illumination beam to angled-dual-axis confocal scanning microscope 301. Optical detector 303 is optically coupled to a second end 304 of second optical fiber 104, to receive an observation beam collected by angled-dual-axis confocal scanning microscope 301 from confocal overlapping volume 121 within object 120. Light source 302 can be a fiber laser, a semiconductor optical amplifier, an optical fiber amplifier, a semiconductor laser, a diode-pumped solid state laser, or any other fiber-coupled light source known in the art. The wavelength of light provided by light source 302 is typically in the range of 0.8–1.6 microns, with an average power of about 20 to 200 milliwatts. Light source 302 may operate in a continuous wave (CW) or pulsed mode. Optical detector 303 can be a PIN diode, or an avalanche photo diode (APD), for instance. In some cases where the observation beam is weak, a photomultiplier tube detector may be used. A skilled artisan will know how to select a proper optical detector for a given application, as described in "Building Electro-Optical Systems, Making it all work" by Philip C. D. Hobbs, John Wiley & Sons, 2000. The resulting signals from optical detector 303 can subsequently be electronically processed and assembled into corresponding image of vertical cross-section scans of object 120 by methods well known in the art. As such, angled-dual-axis confocal scanning system 300 provides a versatile and high-resolution imaging device, and can be readily employed in a variety of applications. Those skilled in the art can implement this angled-dual-axis confocal scanning system of the present invention in a way suitable for a given application.

Figure 3B:
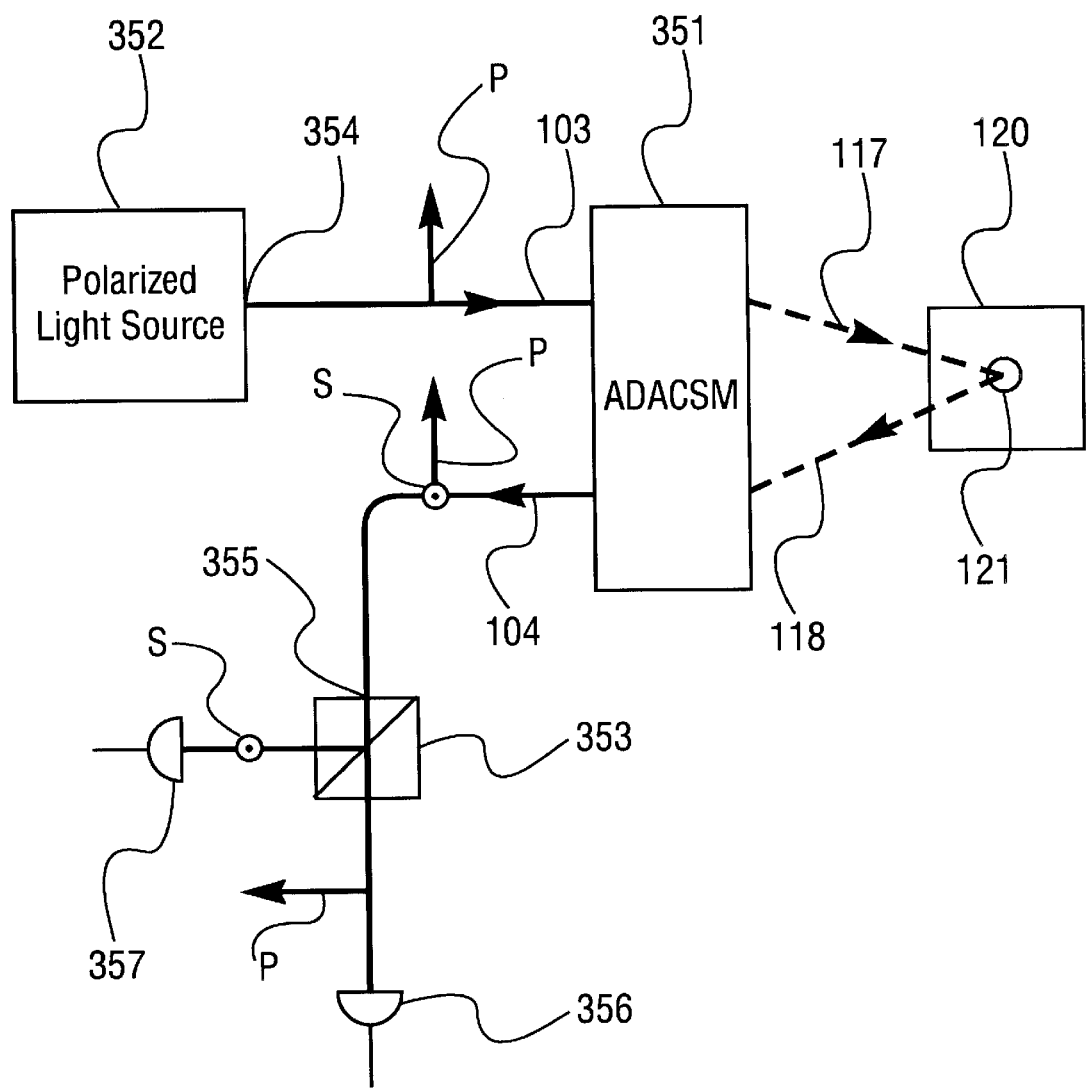

The embodiment described above can also be used to provide specific information pertaining to the polarization state of light emanated from a polarization-altering, e.g., a birefrigent-scattering, medium. Many biological tissues, such as tendons, muscle, nerve, bone, cartilage and teeth, exhibit birefrigence due to their linear or fibrous structure. Birefrigence causes the polarization state of light to be altered (e.g., rotated) in a prescribed manner upon refection. Skin is another birefrigent medium. Collagen contained in skin is a weakly birefrigent material. At temperatures between 56–65° C., collagen denatures and loses its birefrigence. Thus, by detecting induced changes in the polarization state of light reflected from a skin sample, an image representing the regions of skin where thermal injury occurs can be identified. FIG. 3B shows an alternative embodiment of the first angled-dual-axis confocal scanning system of the present invention, pertaining to applications where polarized light is used to probe a birefrigent-scattering (or other polarization-altering) medium. By way of example, angled-dual-axis confocal scanning system 350 comprises an angled-dual-axis confocal scanning microscope (ADACSM) 351, a polarized light source 352, and a polarizing beamsplitter 353. As in FIG. 3A, angled-dual-axis confocal scanning microscope 351 is in a simplified schematic form of one of the embodiments shown in FIGS. 2A–2B, with first and second optical fibers 103, 104 being polarization maintaining fibers capable of supporting two orthogonal polarizations. Polarized light source 352 is optically coupled to a second end 354 of first optical fiber 103, to provide an illumination beam 117 with P-polarization to angled-dual-axis confocal scanning microscope 351. Polarizing beamsplitter 353 is optically coupled to a second end 355 of second optical fiber 104, to receive an observation beam 118 with orthogonal P-polarization and S-polarization collected by angled-dual-axis confocal scanning microscope 351 from confocal overlapping volume 121 within a birefrigent-scattering (or other polarization-altering) object 120. The birefrigent (or other polarization-altering) "scatterers" in object 120 emanate light whose polarization is altered (e.g., rotated) with respect to the polarization of the illumination beam. Such a rotated polarization can be represented in two orthogonal components, e.g., P-polarization and S-polarization. Polarizing beamsplitter 353 separates P-polarization and S-polarization by routing them to two separate optical detectors 356, 357 respectively, such that an image representing these birefrigent (or other polarization-altering) scatterers can be obtained.

In the embodiment of FIG. 3B, polarized light source 352 can be a laser source, such as a semiconductor optical amplifier, an optical fiber amplifier, a semiconductor laser, a diode-pumped solid state laser, or any other fiber-coupled polarized light source known in the art. Polarized light source 352 can also be an assembly consisting of an unpolarized light source optically coupled to a polarizer, such that polarized light is produced and transmitted from the assembly to angled-dual-axis confocal scanning microscope 351 as an illumination beam. Optical detectors 356, 357 can be PIN diodes, avalanche photo diodes, or photomultiplier tubes. Polarizing beamsplitter 353 can be a polarizing beamsplitter evanescent wave optical fiber coupler, for instance. As such, angled-dual-axis confocal scanning system 350 is suited for applications in which high resolution and fast imaging of birefrigent (or other polarization-altering) media is required. Those skilled in the art can implement this angled-dual-axis confocal scanning system of the present invention in a way suitable for a given application.

It should be pointed out that although optical fibers, particularly single-mode fibers, are preferable as optical coupling means between various optical elements in this invention, and are used throughout this specification wherever optical coupling is called for, other suitable optical coupling means can be alternatively implemented in various angled-dual-axis confocal scanning systems of this invention, without deviating from the principle and the scope of the present invention.

Figure 4:
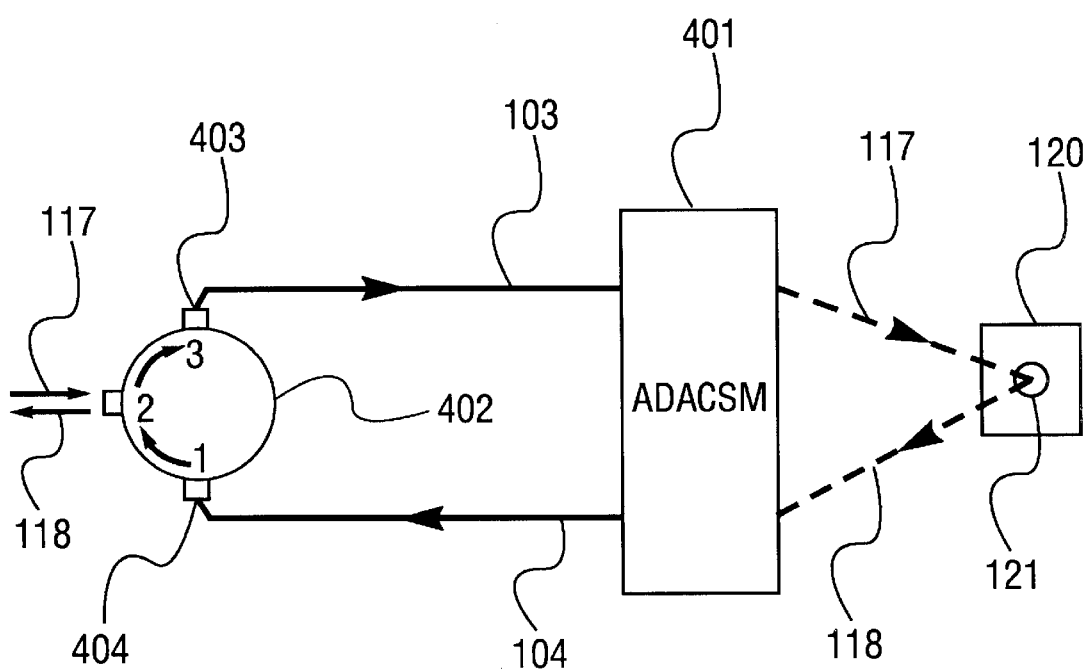
FIG. 4 depicts an exemplary embodiment of an angled-dual-axis confocal scanning module according to the present invention.

FIG. 4 depicts an exemplary embodiment of an angled-dual-axis confocal scanning module according to the present invention. Angled-dual-axis confocal scanning module 400 comprises an angled-dual-axis confocal scanning microscope (ADACSM) 401 and a three-port optical circulator 402. For the purpose of illustration, angled-dual-axis confocal scanning microscope 401 is in a simplified schematic form of one of the embodiments shown in FIGS. 2A–2B, although any other embodiment in accordance with the present invention can also be used. Three-port optical circulator 402 is a non-reciprocal device, which couples light incident on port-1 to port-2, and light incident on port-2 to port-3 with high transmission. Whereas light traveling in a reversed order encounters high isolation. High isolation also exists between port-1 and port-3. For instance, current commercial fiber-coupled circulators known in the art have insertion losses (port-1 to 2, and port-2 to 3 ) less than 0.7 dB, and isolation (port-3 to 2, port-2 to 1 ) greater than 50 dB. Angled-dual-axis confocal scanning module 400 is configured such that port-3 of optical circulator 402 is optically coupled to a second end 403 of first optical fiber 103; port-1 of optical circulator 402 is optically coupled to a second end 404 of second optical fiber 104; and port-2 serves as a bi-directional input/output port. In operation, an illumination beam 117 transmitted to port-2 is passed into port-2 of optical circulator 402 and then coupled to fiber end 403 of angled-dual-axis confocal scanning microscope 401 in nearly its entirety; and an observation beam 118 collected by angled-dual-axis confocal scanning microscope 401 from confocal overlapping volume 121 within object 120 is delivered to port-1 via fiber end 404 and then routed to port-2 of optical circulator 402, to be further utilized or detected in nearly its entirety. As such, angled-dual-axis confocal scanning module 400 of the present invention provides a modular, power-efficient, angled-dual-axis confocal scanning device with a single input/output port, and can be readily incorporated in many optical systems, as the following exemplary embodiments illustrate.

Figure 5A:
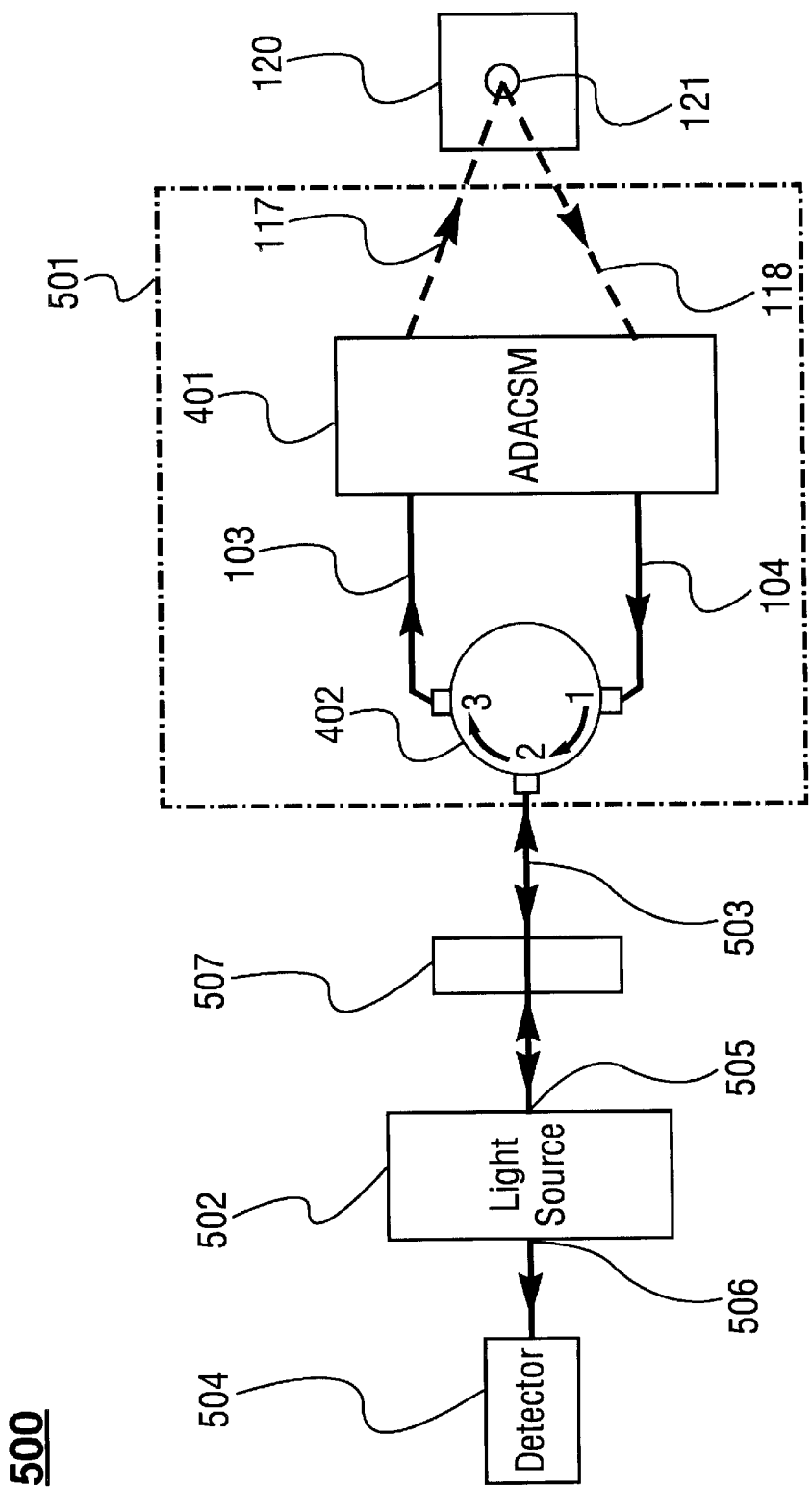
FIGS. 5A–5B show simplified schematic diagrams of second and third angled-dual-axis confocal scanning systems according to the present invention.
Figure 5B:
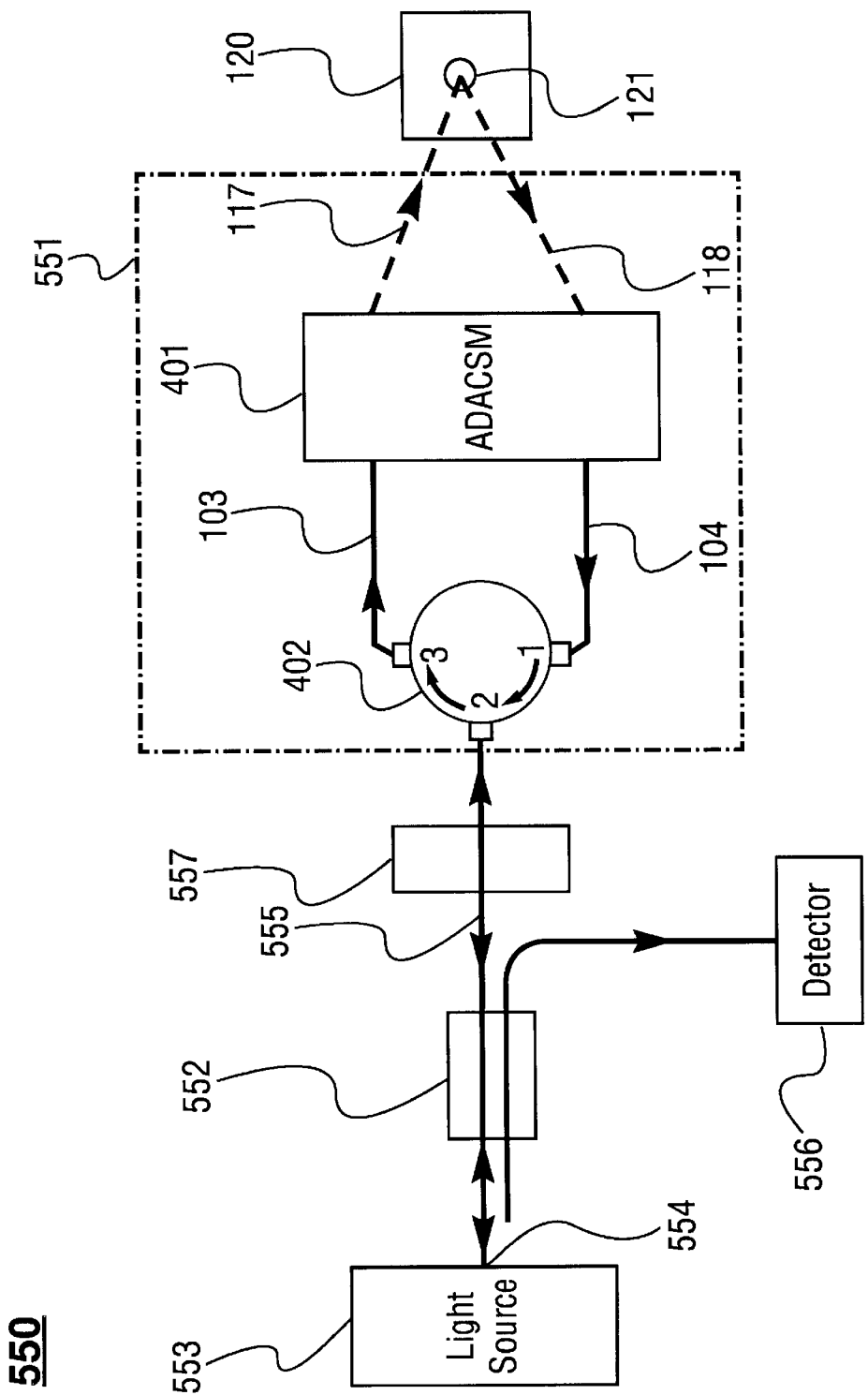

FIGS. 5A–5B show simplified schematic diagrams of second and third angled-dual-axis confocal scanning systems incorporating an angled-dual-axis confocal scanning module of the present invention. Depicted In FIG. 5A is the second angled-dual-axis confocal scanning system 500, comprising an angled-dual-axis confocal scanning module 501, a self-detecting laser source 502, a third optical fiber 503, and an optical detector 504. By way of example, angled-dual-axis confocal scanning module 501 is in the form of the embodiment shown in FIG. 4, although any other embodiment in accordance with the present invention can be alternatively implemented. Laser source 502 is equipped with first output aperture 505 and second output aperture 506. Third optical fiber 503 is optically coupled to first output aperture 505 of laser source 502 on one end and to port-2 of angled-dual-axis confocal scanning module 501 on the other, such that an illumination beam 117 emitted from first output aperture 505 of laser source 502 is transmitted to angled-dual-axis confocal scanning microscope module 501 through port-2, and an observation beam 118 collected by angled-dual-axis confocal scanning module 501 from confocal overlapping volume 121 within object 120 is in turn back coupled to laser source 502 again via first output aperture 505. The feedback into laser source 502 of observation beam 118 emanated from object 120 alters the intensity as well as the modes supported by the laser cavity, and the resulting changes are detected by optical detector 504 optically coupled to second output aperture 506 of laser source 502. The presence of non-reciprocal optical circulator 402 in angled-dual-axis confocal scanning module 501 enables nearly 100% of illumination beam 117 from laser source 502 to be delivered to angled-dual-axis confocal scanning microscope 401, as well as nearly 100% of observation beam 118 collected by angled-dual-axis confocal scanning microscope 401 to be back coupled to laser source 502, hence maximizing the signal-to-noise ratio in detection. The use of self-detecting laser source 502, both as a light source and as a detector, further simplifies the structure of this angled-dual-axis confocal scanning system.

The self-detecting characteristics of lasers have been advantageously exploited in the art to provide an integrated light source and detector, as demonstrated in U.S. Pat. Nos. 5,887,009 and 5,563,710, by R. Juskaitis et al. in "Semiconductor Laser Confocal Microscopy", Applied Optics, 33 (4), pp. 578 (1994), and by R. Juskaitis et al. in "Compact confocal interference microscopy", Optics Communications, 109, pp. 167 (1994), all incorporated herein by reference. A great deal of effort has also been devoted to eliminate such feedback effects; in fact, optical isolators with non-reciprocal optical elements such as Faraday rotators are designed to eliminate or block the back-coupling of light. The effects of laser feedback and the resulting perturbations of laser power and frequency depend on many conditions including laser cavity parameters, and a complete theory is still lacking at the present time. In the present invention, the self-detecting laser source can be a fiber laser, a semiconductor laser, or a diode pumped solid state laser. A fiber-based laser system, such as the fiber laser disclosed by the inventors of this application in U.S. Pat. No. 5,887,009, may be used to take advantage of a wide range of possible designs and laser cavity parameters to optimize the laser self-detecting properties. A semiconductor laser may also be desirable for constructing a low cost device.

Angled-dual-axis confocal scanning system 500 in FIG. 5A further comprises a frequency shifting means (or a phase modulator) in the form of frequency shifter 507 optically coupled to third optical fiber 503, such that the frequency of observation beam 118 is shifted before being back coupled to laser source 502. Frequency shifter 507 can be alternatively coupled to first optical fiber 103, or second optical fiber 104, for the same purpose of shifting the frequency of observation beam 118. The feedback of the frequency-shifted (or phase-modulated) observation beam to laser source 502 results in the laser's output beam being modulated at a beat frequency, thus allowing more sensitive heterodyne detection.

FIG. 5B depicts the third angled-dual-axis confocal scanning system of the present invention, pertaining to the situation where the self-detecting laser is equipped with only one output aperture. Angled-dual-axis confocal scanning system 550 comprises an angled-dual-axis confocal scanning module 551, a beam-splitting means in the form of a fiber-optic coupler 552 a self-detecting laser source 553 having a single output aperture 554. By way of example, angled-dual-axis confocal scanning module 551 is in the form of the embodiment shown in FIG. 4, although any other embodiment in accordance with the present invention can also be implemented. Angled-dual-axis confocal scanning module 551 is optically coupled to fiber-optic coupler 552 by way of a third optical fiber 555, and fiber-optic coupler 552 is in turn optically coupled to laser source 553. Fiber-optic coupler 552 directs a portion of an output beam emitted from output aperture 554 of laser source 553 to port-2 of angled-dual-axis confocal scanning module 551, providing an illumination beam 117. An observation beam 118 collected by confocal scanning module 551 from confocal overlapping volume 121 within object 120 is routed back to laser source 553 again via output aperture 554. Fiber-optic coupler 552 also routes a remainder of the laser's output beam, which carries the perturbations due to the back coupling of observation beam 118, to an optical detector 556. To enhance the back coupling effects, a low-coupling tap coupler, such as a 90/10 fiber-optic coupler, is preferred. To make use of heterodyne detection, a frequency shifting means (or a phase modulator) in the form of frequency shifter 557 is optically coupled to third optical fiber 555, such that the frequency of observation beam 118 is shifted before being back coupled to laser source 553. Frequency shifter 557 can be alternatively coupled to first optical fiber 103, or second optical fiber 104, for the purpose of shifting the frequency of observation beam 118.

Figure 6A:
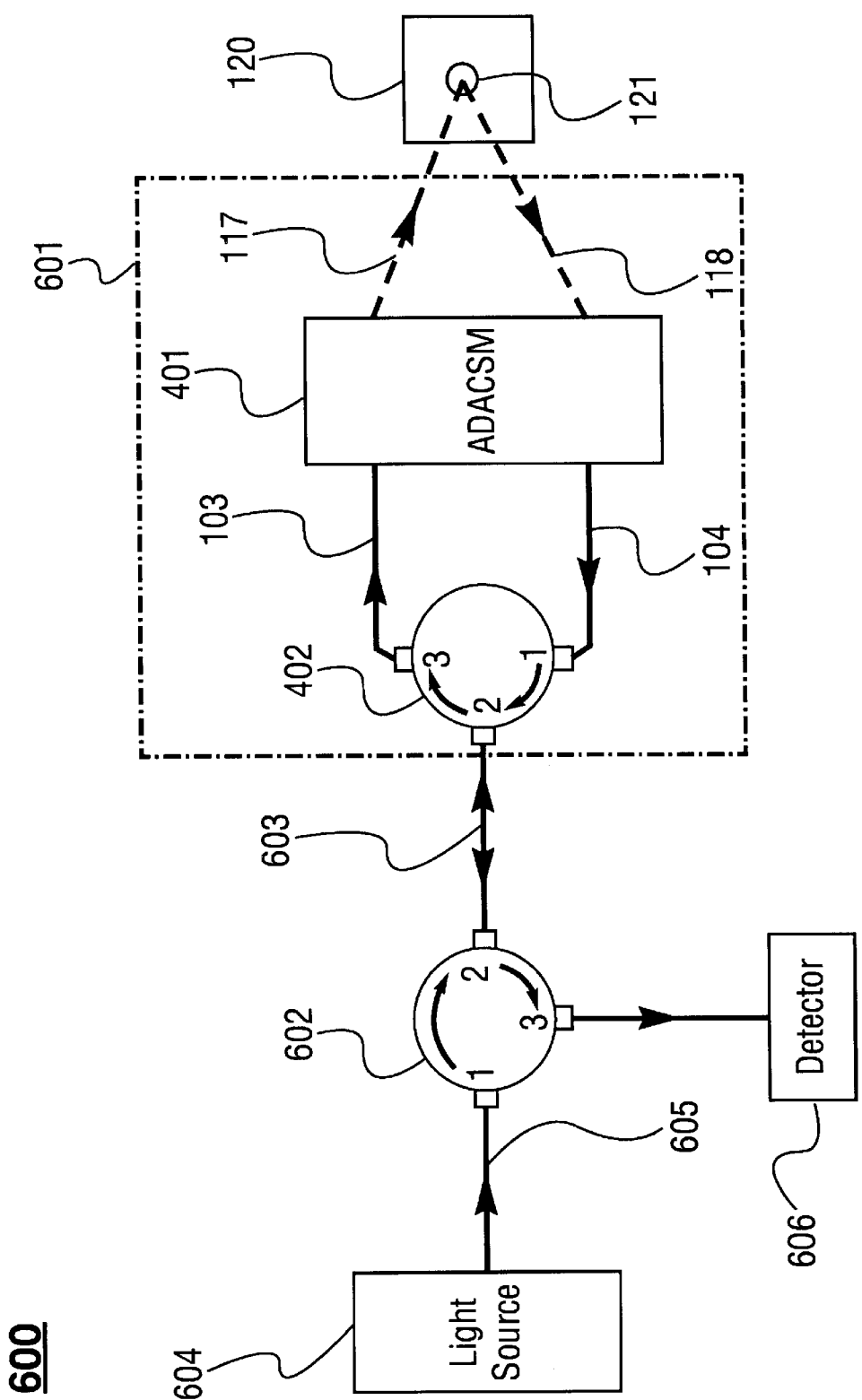
FIGS. 6A–6B depict simplified schematic diagrams of fourth and fifth angled-dual-axis confocal scanning systems according to the present invention.
Figure 6B:
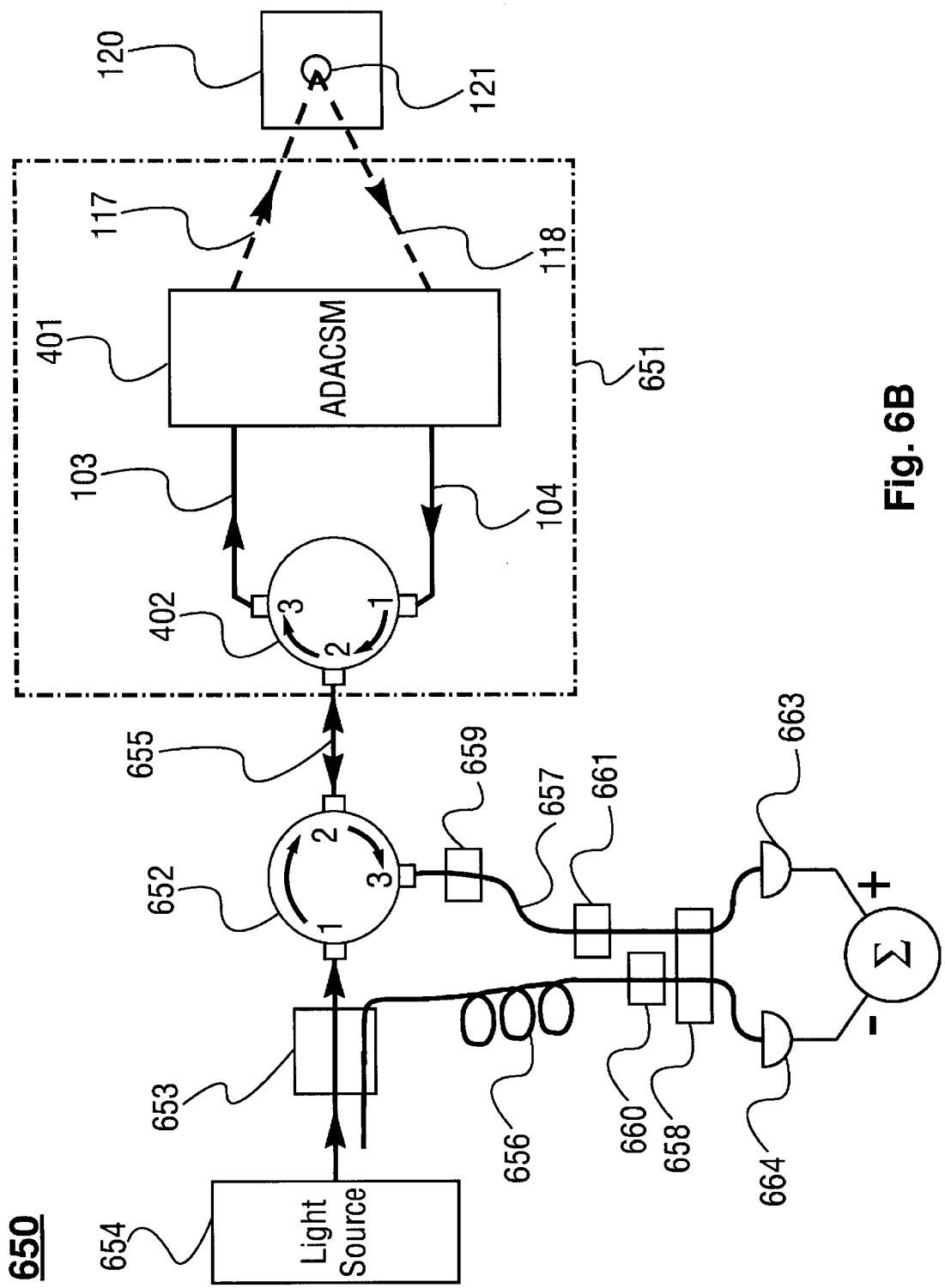

FIGS. 6A–6B depict simplified schematic diagrams of fourth and fifth angled-dual-axis confocal scanning systems of the present invention. Shown in FIG. 6A is the fourth angled-dual-axis confocal scanning system 600 of the present invention, comprising an angled-dual-axis confocal scanning module 601 optically coupled to a second optical circulator 602 by way of a third optical fiber 603, and a light source 604 optically coupled to second optical circulator 602 by way of a forth optical fiber 605. For the purpose of illustration, angled-dual-axis confocal scanning module 601 is in the form of the embodiment shown in FIG. 4, although any other embodiment in accordance with the present invention can be alternatively implemented. Third optical fiber 603 is optically coupled to port-2 of second optical circulator 602 on one end and to port-2 of angled-dual-axis confocal scanning module 601 on the other. Fourth optical fiber 605 in turn optically couples port-1 of second optical circulator 602 to light source 604. In operation, an illumination beam 117 emitted from light source 604 is transmitted to port-1 of and in turn passed onto port-2 of second optical circulator 602, and further transmitted to port-2 of angled-dual-axis confocal scanning module 601. An observation beam 118 collected by angled-dual-axis confocal scanning module 601 from confocal overlapping volume 121 within object 120 is routed back to port-2 of and in turn directed to port-3 of second optical circulator 602, to which an optical detector 606 is optically coupled.

In the aforementioned angled-dual-axis confocal scanning system, light source 604 can be a fiber laser, a semiconductor laser, a diode-pumped solid state laser, or a continuous wave or pulsed fiber-coupled light source known in the art. A skilled artisan can implement an appropriate light source suitable for a given application. Furthermore, the non-reciprocal nature of second optical circulator 602 allows nearly 100% of observation beam 118 to be used for detection, thereby maximizing the signal-to-noise ratio.

The embodiment shown in FIG. 6A can be further modified into an interferometer configuration, such that the observation beam is combined with a portion of the output beam from the light source to create coherent interference. This can be achieved by inserting a beam-splitting means, such as a fiber-optic coupler or a beamsplitter, between the light source and the second optical circulator in the above embodiment. FIG. 6B depicts the fifth angled-dual-axis confocal scanning system 650 of the present invention, comprising an angled-dual-axis confocal scanning module 651, a second optical circulator 652, a beam-splitting means in the form of first fiber-optic coupler 653, and a light source 654. For illustration purposes, angled-dual-axis confocal scanning module 651 is in the form of the embodiment shown in FIG. 4, although any other embodiment in accordance with the present invention can also be implemented. A third optical fiber 655 optically couples port-2 of angled-dual-axis confocal scanning module 651 to port-2 of second optical circulator 652. First fiber-optic coupler 653 is in optical communication with light source 654 and second optical circulator 652, such that it diverts a portion of an output beam from light source 654 to port-1 of second optical circulator 652 and a remainder of the output beam to a reference optical fiber 656, thereby creating an illumination beam 117 and reference beam from the same parent beam. Illumination beam 117 is in turn passed into port-2 of second optical circulator 652, and further transmitted to port-2 of angled-dual-axis confocal scanning module 651 by way of third optical fiber 655. An observation beam 118 collected by angled-dual-axis confocal scanning module 651 from confocal overlapping volume 121 within object 120 is routed back to port-2 of and in turn passed onto to port-3 of second optical circulator 652, and further directed to a detection optical fiber 657. First, second, third, reference and detection fibers 103, 104, 655, 656, 657 have optical path lengths so selected to ensure optical coherence between the reference and observation beams. Reference optical fiber 656 and detection fiber 657 are joined by a second fiber-optic coupler 658, such that a balanced detection scheme can be employed for optimizing signal-to-noise ratio in detection.

To implement balanced detection, a frequency shifting means (or a phase modulator) in the form of frequency shifter 659 is optically coupled to detection optical fiber 657 for shifting the frequency of the observation beam, such that a heterodyne beat frequency is produced between the unshifted reference beam and the shifted observation beam at second fiber-optic coupler 658 and thus detected by two optical detectors 663, 664 at the two outputs of second fiber-optic coupler 658. Frequency shifter 659 can be alternatively coupled to first optical fiber 103, second optical fiber 104, third optical fiber 655, or disposed between first fiber-optic coupler 653 and port-1 of second optical circulator 652, for the same purpose of shifting the frequency of the observation beam. Moreover, frequency shifter 659 can be optically coupled to reference optical fiber 656 for shifting the frequency of the reference beam, such that a heterodyne beat frequency is produced between the shifted reference beam and the unshifted observation beam at the two outputs of fiber-optic coupler 658. The underlying principle of balanced detection and its advantages in fiber-optic interferometers are well known in the art, as described by Rollins et al. in "Optimal interferometer designs for optical coherence tomography", Optics Letters, 24 (21), pp. 1484 (1999), and by Podoleanu in "Unbalanced versus balanced operation in an optical coherence tomography system", Applied Optics, 39 (1), pp. 173 (2000), incorporated herein by reference.

Angled-dual-axis confocal scanning system 650 in FIG. 6B further comprises an adjustable optical delay device 660 optically coupled to reference optical fiber 656, serving to maintain coherent interference between the reference and observation beams. Adjustable Optical delay device 660 can be alternatively coupled to detection optical fiber 657, or anywhere else along the light path, for achieving the same purpose. In applications where light source 654 has a short coherence length, then delay device 660 can be adjusted such that only single-scattered light in observation beam 118 is coherent with the reference beam at second fiber-optic coupler 658 and multiple-scattered light, which traverses over a larger optical path length in observation beam 118, does not contribute to the coherent interference, therefore providing further filtering of multiple-scattered light.

To further increase the signal-to-noise ratio in detection of weak optical signals, an optical amplifier 661, such as a two-port fiber amplifier or semiconductor optical amplifier, is optically coupled to detection optical fiber 657 in the embodiment of FIG. 6B, to boost up the power of the observation beam. Optical amplifier 661 can be alternatively coupled to second optical fiber 104, for the purpose of amplifying the observation beam. An amplified observation beam allows faster scanning rates and consequently higher pixel rates without appreciable loss in the signal-to-noise ratio, because a shorter integration time per pixel of an image is required in data collection. The implementation of balanced detection in this case also allows subtraction of optical amplifier noise, since most of spontaneous emission of optical amplifier 661 would not occur at the heterodyne beat frequency described above.

Light source 654 in FIG. 6B can be an optical fiber amplifier, a semiconductor optical amplifier, a fiber laser, a semiconductor laser, a diode-pumped solid state laser, or a continuous wave or pulsed broadband OCT light source having a short coherence length, as is well known in the art. For biological or medical applications, the light source should produce light in the wavelength range of about 0.8 to 1.6 microns, since biological tissues are particularly transparent in this range. The various optical fibers are preferably of single-mode type, for single-mode fibers offer the advantage of simplicity and automatic assurance of the mutual spatial coherence of the observation and reference beams upon detection. If a polarized light beam is provided by light source 654, first fiber-optic coupler 653 should be a polarization maintaining coupler. Various optical fibers in the system should be polarization maintaining fibers, capable of supporting two orthogonal polarizations. First and second optical circulators 402, 652 should also be polarization maintaining. In this case, the reference and observation beams can be brought into the same polarization by rotating either reference optical fiber 656, or detection optical fiber 657, before coupling it to second fiber-optic coupler 658. Alternatively, a polarization rotation means, such as a Faraday rotator, can be coupled to either reference optical fiber 656, or detection optical fiber 657, such that the reference and observation beams have substantially the same polarization when combined. Furthermore, second fiber-optic coupler 658 should be a polarization maintaining fiber coupler to optimally mix the polarized observation and reference beams. All in all, by carefully controlling the polarizations of the beams in angled-dual-axis confocal scanning system 650, the single-to-noise ratio of detection can be enhanced.

In the angled-dual-axis confocal scanning systems described above, fiber-optic couplers are used to serve as beam-splitting means. Optical fibers, preferably single-mode fibers, are employed for the purpose of providing optical coupling. Optical circulators are preferably fiber-coupled circulators. These fiber-optic components, along with the fiber-coupled angled-dual-axis confocal scanning module of the present invention, enable the confocal scanning systems thus constructed to be all fiber-based systems, hence fully exploiting the flexibility, scalability, ruggedness and economical value afforded by optical fibers.

Alternatively, those skilled in the art may substitute the fiber-optic couplers and optical circulators by other types of beam-splitting and beam-routing means, such as assemblies of beamsplitters, prisms, and birefrigent elements, and the optical fibers by other types of free space or bulk optical coupling means well known in the art, in the angled-dual-axis confocal scanning systems of the present invention without deviating from the principle and the scope of the present invention. Further, the methods for detection of optical signals and for electronic processing of the detected signals into images are well known in the art. A skilled artisan can make suitable design choices for a given application.

All in all, the angled-dual-axis confocal scanning microscope of the present invention provides many advantages over the prior art systems, most notably: enhanced axial resolution while maintaining a workable working distance and a large field of view, fast and high-precision scanning, low noise, an integrated and scalable structure. Moreover, by using low NA focusing elements (or lenses), the angled-dual-axis confocal scanning microscope of the present invention is capable of minimizing multiple-scattered light, thereby achieving higher sensitivity and larger dynamic range of detection, a capability particularly desirable for imaging within a scattering medium. Additionally, the integration of the angled-dual-axis confocal scanning microscope of the present invention with fiber-optic components and a fiber-coupled laser provides an assembly of fiber-based angled-dual-axis confocal scanning systems that can be particularly powerful tools in biological and medical imaging applications, such as instruments for performing optical coherence microscopy and in vivo optical biopsies.

Although the present invention and its advantages have been described in detail, it should be understood that various changes, substitutions, and alternations can be made herein without departing from the principle and the scope of the invention. Accordingly, the scope of the present invention should be determined by the following claims and their legal equivalents.

What is claimed is:

1. An angled-dual-axis confocal scanning system comprising an angled-dual-axis confocal scanning head, wherein said angled-dual-axis confocal scanning head comprises:

a) a first optical fiber having first and second ends, for providing an illumination beam at said first end;

b) a second optical fiber having first and second ends;

c) an angled-dual-axis focusing means for focusing said illumination beam to an illumination focal volume along an illumination axis within an object and for receiving an observation beam emanated from an observation focal volume along an observation axis within said object such that said observation beam is focused onto said first end of said second optical fiber; and d) a scanning means for producing an arc-line scan, wherein said scanning means is in optical communication with said focusing means and said object, wherein said scanning means receives said illumination beam from said angled-dual-axis focusing means and directs said illumination beam to said illumination focal volume within said object, and wherein said scanning means collects said observation beam emanated from said observation focal volume and passes said observation beam to said angled-dual-axis focusing means; wherein said illumination axis and said observation axis intersect at an angle within said object, such that said illumination focal volume and said observation focal volume intersect at a confocal overlapping volume, and wherein said scanning means is capable of pivoting said illumination and observation beams in such a way that said illumination axis and said observation axis remain intersecting at said angle and that said confocal overlapping volume moves along an arc-line within said object, thereby producing said arc-line scan.

2. The angled-dual-axis confocal scanning system of claim 1 further comprising a vertical scanning unit, wherein said vertical scanning unit comprises:

a) a translation means mechanically coupled to said angled-dual-axis confocal scanning head; and b) a compensation means for ensuring said intersection of said illumination focal volume and observation focal volume;

wherein said translation means is capable of causing said angled-dual-axis confocal scanning head to move relative to said object, whereby a succession of arc-line scans that progressively deepen into said object is produced, providing a vertical cross-section scan.

3. The angled-dual-axis confocal scanning system of claim 2 wherein said compensation means comprises a fluid filling a space between said scanning means and said object, wherein said fluid is transparent to said illumination beam and said observation beam, and wherein said fluid has an index of refraction that is the same as an index of refraction of said object.

4. The angled-dual-axis confocal scanning system of claim 3 further comprising a window assembly interposed between said scanning means and said fluid for passage of said illumination and observation beams.

5. The angled-dual-axis confocal scanning system of claim 4 wherein said window assembly comprises a transparent flat window.

6. The angled-dual-axis confocal scanning system of claim 4 wherein said window assembly comprises first and second transparent flat windows in an angled arrangement, such that said illumination axis is perpendicular to said first flat window and said observation axis is perpendicular to said second flat window.

7. The angled-dual-axis confocal scanning system of claim 3 further comprising a transparent window interposed between said fluid and said object for passage of said illumination and observation beams.

8. The angled-dual-axis confocal scanning system of claim 3 wherein said fluid is contained in a sealed hydraulic system, including a reservoir for replenishing and receiving excess fluid in the course of vertical cross-section scans.

9. The angled-dual-axis confocal scanning system of claim 1 wherein said angled-dual-axis focusing means comprises one or more elements selected from the group consisting of refractive lenses, diffractive lenses, GRIN lenses, focusing gratings, micro-lenses, holographic optical elements, curved mirrors, and binary lenses.

10. The angled-dual-axis confocal scanning system of claim 9 wherein said angled-dual-axis focusing means comprises a single element, where said element provides said illumination axis and said observation axis.

11. The angled-dual-axis confocal scanning system of claim 9 wherein said angled-dual-axis focusing means comprises an illumination focusing element and an observation focusing element, wherein said illumination focusing element provides said illumination axis, and wherein said observation focusing element provides said observation axis.

12. The angled-dual-axis confocal scanning system of claim 11 wherein said illumination focusing element and said observation focusing element are of the same type, comprising a focusing element selected from the group consisting of refractive lenses, diffractive lenses, GRIN lenses, micro-lenses, binary lenses, and curved mirrors.

13. The angled-dual-axis confocal scanning system of claim 12 wherein said focusing element has a numerical aperture (NA) in the range of 0.1 and 0.4.

14. The angled-dual-axis confocal scanning system of claim 11 further comprising a first collimating lens, wherein said first collimating lens receives said illumination beam from said first end of said first optical fiber and passes a substantially collimated illumination beam to said illumination focusing element.

15. The angled-dual-axis confocal scanning system of claim 14 further comprising a second collimating lens, wherein said second collimating lens receives said observation beam from said observation focusing element and focuses said observation beam to said first end of said second optical fiber.

16. The angled-dual-axis confocal scanning system of claim 1 wherein said scanning means comprises one or more elements selected from the group consisting of scanning mirrors, reflectors, acousto-optic deflectors, electro-optic deflectors, mechanical scanning mechanisms, and Micro-Electro-Mechanical-Systems (MEMS) scanning micromirrors.

17. The angled-dual-axis confocal scanning system of claim 16 wherein said scanning means comprises a single scanning mirror, wherein said scanning mirror is flat and can be pivoted about one axis.

18. The angled-dual-axis confocal scanning system of claim 17 wherein said scanning mirror is a single silicon micro-machined mirror.

19. The angled-dual-axis confocal scanning system of claim 16 wherein said scanning means comprises two scanning mirrors that are coplanar, wherein said scanning mirrors are flat and can co-rotate about one common axis.

20. The angled-dual-axis confocal scanning system of claim 19 wherein said scanning mirrors are silicon micro-machined mirrors.

21. The angled-dual-axis confocal scanning system of claim 16 wherein said scanning means comprises two scanning mirrors, wherein each of said scanning mirrors is flat and can be pivoted about one or more axes, and wherein said scanning mirrors are configured such that they can be operated in synchronous motion.

22. The angled-dual-axis confocal scanning system of claim 21 wherein said scanning mirrors are silicon micromachined mirrors.

23. The angled-dual-axis confocal scanning system of claim 1 wherein said angled-dual-axis confocal scanning head is mechanically coupled to a substrate.

24. The angled-dual-axis confocal scanning system of claim 23 wherein said substrate comprises a silicon substrate etched with V-grooves.

25. The angled-dual-axis confocal scanning system of claim 1 wherein either of said first and second optical fibers comprises an element selected from the group consisting of single-mode fibers, polarization maintaining fibers, multi-mode fibers, and birefirgent fibers.

26. The angled-dual-axis confocal scanning system of claim 25 wherein each of said first and second optical fibers comprises a single-mode fiber.

27. The angled-dual-axis confocal scanning system of claim 1 wherein said observation beam comprises reflected light emanated from said confocal overlapping volume within said object.

28. The angled-dual-axis confocal scanning system of claim 1 wherein said observation beam comprises fluorescent light emanated from said confocal overlapping volume within said object.

29. The angled-dual-axis confocal scanning system of claim 1 wherein said illumination focal volume and said observation focal volume are diffraction-limited, determined by main lobes of said illumination beam's point-spread function and said observation beam's point-spread function.

30. The angled-dual-axis confocal scanning system of claim 29 wherein said confocal overlapping volume is diffraction-limited.

31. The angled-dual-axis confocal scanning system of claim 1 wherein said illumination beam is a polarized beam, and wherein first and second optical fibers are polarization maintaining fibers, capable of supporting two orthogonal polarizations.

32. The angled-dual-axis confocal scanning system of claim 1 further comprising a light source optically coupled to said second end of said first optical fiber.

33. The angled-dual-axis confocal scanning system of claim 32 wherein said light source comprises an element selected from the group consisting of optical fiber amplifiers, fiber lasers, semiconductor optical amplifiers, semiconductor lasers, and diode-pumped solid state lasers.

34. The angled-dual-axis confocal scanning system of claim 32 wherein said light source comprises a polarized light source, and wherein said second end of said second optical fiber is optically coupled to a polarizing beamsplitter.

35. The angled-dual-axis confocal scanning system of claim 34 further comprising two optical detectors, optically coupled to said polarizing beamsplitter.

36. The angled-dual-axis confocal scanning system of claim 1 further comprising one or more optical detectors optically coupled to said second end of said second optical fiber.

37. The angled-dual-axis confocal scanning system of claim 36 wherein said one or more optical detectors comprise one or more elements selected from the group consisting of PIN diodes, avalanche photo diodes, and photo-multiplier tube detectors.

38. The angled-dual-axis confocal scanning system of claim 1 further comprising a first optical circulator having first, second, and third ports, wherein said third port is optically coupled to said second end of said first optical fiber, wherein said first port is optically coupled to said second end of said second optical fiber, and wherein said second port provides a bi-directional input/output port.

39. The angled-dual-axis confocal scanning system of claim 38 further comprising a self-detecting laser source having first and second output apertures, wherein said first output aperture is optically coupled to said second port of said first optical circulator, and wherein said second output aperture is optically coupled to an optical detector.

40. The angled-dual-axis confocal scanning system of claim 39 wherein said self-detecting laser source comprises an element selected from the group consisting of fiber lasers, semiconductor lasers, and diode-pumped solid state lasers.

41. The angled-dual-axis confocal scanning system of claim 39 further comprising a frequency shifting means optically coupled to said second optical fiber, for shifting the frequency of said observation beam.

42. The angled-dual-axis confocal scanning system of claim 39 further comprising a frequency shifting means optically coupled to said first optical fiber, for shifting the frequency of said illumination beam.

43. The angled-dual-axis confocal scanning system of claim 39 further comprising a frequency shifting means in optical communication with said self-detecting light source and said first optical circulator, for shifting the frequency of said observation beam.

44. The angled-dual-axis confocal scanning system of claim 39 further comprising a self-detecting laser source having a single output aperture, wherein said output aperture is optically coupled to said second port of said first optical circulator via a beam-splitting means, such that said beam splitting means routes a portion of an output beam emitted from said output aperture to said second port of said first optical circulator and a remainder of said output beam to an optical detector.

45. The angled-dual-axis confocal scanning system of claim 44 wherein said self-detecting light source comprises an element selected from the group consisting of fiber lasers, semiconductor lasers, and diode-pumped solid state lasers.

46. The angled-dual-axis confocal scanning system of claim 44 wherein said beam-splitting means comprises an element selected from the group consisting of fiber-optic couplers, polarization maintaining fiber-optic couplers, beamsplitters, and polarizing beamsplitters.

47. The angled-dual-axis confocal scanning system of claim 44 further comprising a frequency shifting means optically coupled to said second optical fiber, for shifting the frequency of said observation beam.

48. The angled-dual-axis confocal scanning system of claim 44 further comprising a frequency shifting means optically coupled to said first optical fiber, for shifting the frequency of said illumination beam.

49. The angled-dual-axis confocal scanning system of claim 44 further comprising a frequency shifting means in optical communication with said beam-splitting means and said first optical circulator, for shifting the frequency of said observation beam.

50. The angled-dual-axis confocal scanning system of claim 38 further comprising a second optical circulator having first, second and third ports, wherein said second port is optically coupled to said second port of said first optical circulator.

51. The angled-dual-axis confocal scanning system of claim 50 wherein said second port of said second optical circulator is optically coupled to said second port of said first optical circulator via a third optical fiber.

52. The angled-dual-axis confocal scanning system of claim 50 further comprising a light source, wherein said first port of said second optical circulator is optically coupled to said light source.

53. The angled-dual-axis confocal scanning system of claim 52 further comprising an optical detector, optically coupled to said third port of said second optical circulator.

54. The angled-dual-axis confocal scanning system of claim 52 wherein said light source is optically coupled to said first port of said second optical circulator via a beam-splitting means, such that said beam-splitting means routes a portion of an output beam emitted from said light source to said first port of said second optical circulator, providing said illumination beam, and wherein a remainder of said output beam provides a reference beam.

55. The angled-dual-axis confocal scanning system of claim 54 wherein said beam-splitting means comprises a first fiber-optic coupler, and wherein said reference beam is routed to a reference optical fiber.

56. The angled-dual-axis confocal scanning system of claim 55 further comprising a detection optical fiber optically coupled to said third port of second optical circulator, wherein said reference optical fiber and said detection optical fiber are coupled by a second fiber-optic coupler.

57. The angled-dual-axis confocal scanning system of claim 56 further comprising a frequency shifting means optically coupled to said reference optical fiber, for shifting the frequency of said reference beam.

58. The angled-dual-axis confocal scanning system of claim 56 further comprising a frequency shifting means optically coupled to said detection optical fiber, for shifting the frequency of said observation beam.

59. The angled-dual-axis confocal scanning system of claim 56 further comprising an optical amplifier optically coupled to said detection optical fiber, for amplifying said observation beam.

60. The angled-dual-axis confocal scanning system of claim 56 further comprising an adjustable optical delay device optically coupled to said detection optical fiber.

61. The angled-dual-axis confocal scanning system of claim 56 further comprising an adjustable optical delay device optically coupled to said reference optical fiber.

62. The angled-dual-axis confocal scanning system of claim 56 further comprising one or more optical detectors, optically coupled to said second fiber optic coupler.

63. The angled-dual-axis confocal scanning system of claim 54 further comprising a frequency shifting means optically coupled to said second optical fiber, for shifting the frequency of said observation beam.

64. The angled-dual-axis confocal scanning system of claim 54 further comprising a frequency shifting means optically coupled to said first optical fiber, for shifting the frequency of said illumination beam.

65. The angled-dual-axis confocal scanning system of claim 54 further comprising a frequency shifting means in optical communication with said second port of said second optical circulator and said second port of said first optical circulator, for shifting the frequency of said observation beam.

66. The angled-dual-axis confocal scanning system of claim 54 further comprising a frequency shifting means optically coupled to said third port of said second optical circulator, for shifting the frequency of said observation beam.

67. The angled-dual-axis confocal scanning system of claim 54 further comprising an optical amplifier optically coupled to said second optical fiber, for amplifying said observation beam.

68. The angled-dual-axis confocal scanning system of claim 54 further comprising an optical amplifier optically coupled to said third port of said second optical circulator, for amplifying said observation beam.

69. The angled-dual-axis confocal scanning system of claim 2 further comprising a first optical circulator having first, second, and third ports, wherein said third port is optically coupled to said second end of said first optical fiber, and wherein said first port is optically coupled to said second end of said second optical fiber.

70. The angled-dual-axis confocal scanning system of claim 69 further comprising a self-detecting laser source having first and second output apertures, wherein said first output aperture is optically coupled to said second port of said first optical circulator, and wherein said second output aperture is optically coupled to an optical detector.

71. The angled-dual-axis confocal scanning system of claim 69 further comprising a self-detecting laser source having a single output aperture, wherein said output aperture is optically coupled to said second port of said first optical circulator via a beam-splitting means, such that said beam splitting means routes a portion of an output beam emitted from said output aperture to said second port of said optical circulator and a remainder of said output beam to an optical detector.

72. The angled-dual-axis confocal scanning system of claim 69 further comprising a second optical circulator, wherein a second port of said second optical circulator is optically coupled to said second port of said first optical circulator.

73. The angled-dual-axis confocal scanning system of claim 72 further comprising a light source, wherein a first port of said second optical circulator is optically coupled to said light source, and wherein a third port of said second optical circulator is optically coupled to a first end of a detection optical fiber.

74. The angled-dual-axis confocal scanning system of claim 73 wherein said light source is optically coupled to said first port of said second optical circulator via a beam-splitting means, such that said beam-splitting means routes a portion of an output beam emitted from said light source to said first port of said second optical circulator and a remainder of said output beam to a first end of a reference optical fiber.

75. The angled-dual-axis confocal scanning system of claim 74 wherein said detection optical fiber and said reference optical fiber are coupled by a fiber-optic coupler.

76. A method of performing angled-dual-axis confocal scanning on a sample, comprising:
   a) transmitting an illumination beam emerging from a first end of a first optical fiber to an angled-dual-axis focusing means;
   b) passing said illumination beam from said angled-dual-axis focusing means to a scanning means;
   c) using said scanning means to direct said illumination beam to an illumination focal volume along an illumination axis within said sample;
   d) using said scanning means to collect an observation beam emanated from an observation focal volume along an observation axis within said sample, wherein said illumination axis and said observation axis intersect at an angle within said sample, such that said illumination focal volume and said observation focal volume intersect at a confocal overlapping volume;
   e) passing said observation beam from said scanning means to said angled-dual-axis focusing means;
   f) focusing said observation beam to a first end of a second optical fiber; and
   g) pivoting said scanning means in such a way that said illumination axis and said observation axis remain intersecting at said angle and that said confocal overlapping volume moves along an arc-line within said sample, thereby producing an arc-line scan.

77. The method of claim 76 further comprising the step of moving said first ends of said first and second optical fibers, said angled-dual-axis focusing means, and said scanning means in unity relative to said sample and repeating said step of g), whereby a succession of arc-line scans that progressively deepen into said sample is produced, providing a vertical cross-section scan.

78. The method of claim 77 further comprising the step of filling a space between said scanning means and said sample with a fluid, wherein said fluid is transparent to said illumination beam and said observation beam, and wherein said fluid has an index of refraction that is the same as an index of refraction of said sample, for ensuring said intersection of said illumination focal volume and said observation focal volume in the course of vertical cross-section scans.

79. The method of claim 78 further comprising the step of disposing a window assembly between said scanning means and said fluid for passage of said illumination and observation beams.

80. The method of claim 78 further comprising the step of disposing a transparent window between said fluid and said sample for passage of said illumination and observation beams.

81. The method of claim 76 further comprising the step of mechanically coupling said first ends of said first and second fibers, said angled-dual-axis focusing means, and said scanning means to a substrate.

82. The method of claim 76 wherein said scanning means comprises a flat scanning mirror that can be pivoted about one axis.

83. The method of claim 82 wherein said scanning mirror is a silicon on fl micro-machined scanning mirror.

84. The method of claim 76 wherein said scanning means comprises two flat coplanar scanning mirrors that can co-rotate about one common axis.

85. The method of claim 84 wherein said scanning mirrors are silicon micro-machined scanning mirrors.

86. The method of claim 76 wherein said scanning means comprises two flat scanning mirrors, wherein each of said scanning mirrors can be pivoted about an axis.

87. The method of claim 86 wherein each of said scanning mirrors is a silicon micro-machined scanning mirror.

88. The method of claim 76 wherein said angled-dual-axis focusing means comprises a single element, where said element provides said illumination axis and said observation axis.

89. The method of claim 76 wherein said angled-dual-axis focusing means comprises an illumination element and an observation element, wherein said illumination element provides said illumination axis, and wherein said observation element provides said observation axis.

90. The method of claim 76 further comprising the step of coupling a second end of said first optical fiber to a light source and a second end of said second optical fiber to an optical detector, such that said illumination beam is transmitted from said light source and said observation beam is routed to said optical detector.

91. The method of claim 76 further comprising the step of coupling a second end of said first optical fiber to a third port of and a second end of said second optical fiber to a first port of a three-port optical circulator.

92. The method of claim 91 further comprising the step of coupling a second port of said optical circulator to a first output aperture of a self-detecting light source and coupling a second output aperture of said self-detecting light source to an optical detector, such that said illumination beam is transmitted from said first output aperture and said observation beam is back coupled to said first output aperture.

93. The method of claim 91 further comprising the step of coupling a second port of said optical circulator to a second port of an auxiliary three-port optical circulator, a first port of said auxiliary optical circulator to a light source, and a third port of said auxiliary optical circular to a first end of a detection optical fiber, such that said illumination beam originates from said light source and said observation beam is routed to said detection optical fiber.

94. The method of claim 93 further comprising the step of coupling a beam-splitting means between said light source and said first port of said auxiliary optical circulator, such that said beam-splitting means routes a portion of an output beam emitted from said light source to said first port of said auxiliary optical circulator, providing said illumination beam, and a remainder of said output beam to a first end of a reference optical fiber, providing a reference beam.

95. The method of claim 94 further comprising the step of combining and detecting coherent interference between said reference beam and said observation beam.

96. The method of claim 95 further comprising the step of joining said reference optical fiber and said detection optical fiber by a fiber-optic coupler and implementing balanced detection scheme.

97. The method of claim 95 further comprising the step of shifting the frequency of said observation beam and using heterodyne detection to detect coherent interference between said reference beam and said observation beam.

98. The method of claim 95 further comprising the step of shifting the frequency of said reference beam and using heterodyne detection to detect coherent interference between said reference beam and said observation beam.

* * * * *